US012659511B2

(12) United States Patent
Oh

(10) Patent No.: US 12,659,511 B2
(45) Date of Patent: Jun. 16, 2026

(54) POINT CLOUD DATA TRANSMISSION DEVICE AND METHOD, AND POINT CLOUD DATA RECEPTION DEVICE AND METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 18/575,694

(22) PCT Filed: Jul. 14, 2022

(86) PCT No.: PCT/KR2022/010267
§ 371 (c)(1),
(2) Date: Dec. 29, 2023

(87) PCT Pub. No.: WO2023/287214
PCT Pub. Date: Jan. 19, 2023

(65) Prior Publication Data

US 2024/0323433 A1 Sep. 26, 2024

(30) Foreign Application Priority Data

Jul. 14, 2021 (KR) ........................ 10-2021-0092513

(51) Int. Cl.
*H04N 19/597* (2014.01)
*H04N 19/169* (2014.01)
*H04N 19/96* (2014.01)

(52) U.S. Cl.
CPC ....... *H04N 19/597* (2014.11); *H04N 19/1883* (2014.11); *H04N 19/96* (2014.11)

(58) Field of Classification Search
CPC .. H04N 19/597; H04N 19/1883; H04N 19/96; G06T 9/001; G06T 9/40
USPC .................................................... 375/240.01
See application file for complete search history.

(56) References Cited

FOREIGN PATENT DOCUMENTS

| | | | | | |
|---|---|---|---|---|---|
| CN | 112256652 A | * | 1/2021 | ............... | G06T 9/40 |
| WO | WO-2020072665 A1 | * | 4/2020 | ............. | G06T 15/20 |

OTHER PUBLICATIONS

"MPEG 3D Graphics Coding," ISO/IEC JTC 1/SC 29/WG 7 N0099, Jul. 1, 2021. (Year: 2021).*
English Translation of CN-112256652-A. (Year: 2021).*
[No Author Listed] "MPEG 3D Graphics Coding," ISO/IEC JTC 1/SC 29/WG 7 N0099, Jul. 1, 2021, 151 pages.
Extended European Search Report in European Appln. No. 22842476.8, mailed on Aug. 27, 2024, 11 pages.
Sugimoto, "[G-PCC][EE13.44 related] Signaling of group structure for partial decoding," ISO/IEC JTC 1/SC 29/WG 7, M55793, Online, Jan. 2021, 4 pages.

* cited by examiner

*Primary Examiner* — Matthew K Kwan
(74) *Attorney, Agent, or Firm* — Fish & Richardson P.C.

(57) ABSTRACT

A point cloud data transmission method according to the embodiments may comprise the steps of encoding point cloud data, and transmitting a bitstream comprising the point cloud data. A point cloud data reception method according to the embodiments may comprise the steps of receiving a bitstream comprising point cloud data, and decoding the point cloud data.

12 Claims, 45 Drawing Sheets

Example of octree based point cloud layer (or LoD) generation

Retained 0: root to octree layer N-3

Retained 1: octree layer N-2

Retained 2: octree layer N-1

*the remains could be divided into three:*

Retained 3: octree layer N (mod 3=1)
Retained 4: octree layer N (mod 3=2)
Retained 5: octree layer N (remnant)

0 (root)
1
2
3
4
5
6
7 (leaf)

Example of octree based point cloud layer (or LoD)generation

LoD 0: root to octree layer N-3

LoD 1

LoD 2

LoD 3

LoD 4

LodD 5

Retained 1: octree layer N-2
Retained 2: octree layer N-1
*the remains could be divided into three:*
Retained 3: octree layer N (mod 3=1)
Retained 4: octree layer N (mod 3=2)
Retained 5: octree layer N (remnant)

0 (root)
1
2
3
4
5
6
7 (leaf)

FIG. 26

| attribute_parameter_set( ) { | Descriptor |
|---|---|
| aps_attr_parameter_set_id | ue(v) |
| aps_seq_parameter_set_id | ue(v) |
| octree_based_layering_flag | u(1) |
| if (octree_based_layering_flag == 1 ) { | |
| num_layers // ex) LoD num | u(8) |
| num_index | u(8) |
| for ( i = 0; i < num_index; i++ ) { | |
| octree_level_start[i] | u(8) |
| num_octree_levels [i] | u(8) |
| if ( num_octree_levels [i] == 1 ) { | |
| multiple_layers_present_flag[i] | u(1) |
| if ( multiple_layers_present_flag[i] == 1 ) { | |
| num_sub_layers[i] | u(8) |
| for ( j=0; j<num_sub_layers[i]; j++ ) { | |
| division_type[i][j] | u(8) |
| num_points[i][j] | u(8) |
| } | |
| } | |
| } | |
| else { | |
| num_point[i] | u(8) |
| } | |
| } | |
| ...... | |
| } | |

1) Method of grouping point cloud data with same modular result for number of divisions (num_division[i])

① ② ③ ······ ① ② ③

2) Method of dividing point cloud data into certain quantity in sequential manner

① ······ ①|② ······ ②|③ ······ ③ num_point[i][0]     num_point[i][1]     num_point[i][2]

FIG. 29

$$p_{i-1}(x, y, z) = p_i([x/2], [y/2], [z/2]) \quad \sim 2900$$

$$r_i(x, y, z) = g\{c_i(x, y, z), p_i(x, y, z)\} = c_i(x, y, z) - p_i(x, y, z) \quad \sim 2901$$

$$\underset{29011}{\big\}} \qquad \underset{29012}{\big\}}$$

$$d'_i(x, y, z) = Q\{d_i(x, y, z)\} = round\,[d_i(x, y, z)/q] \quad \sim 2902$$

$$p_{i-1}(x, y, z) = c_{i-1}([x/2], [y/2], [z/2]) \quad \sim 2903$$

FIG. 31

$$\hat{p}_l(x, y, z)=\hat{c}_{l-1}(2\times[x/2], [2\times y/2], 2\times[z/2])$$ 3100

$$\hat{c}_l(x, y, z)=g^{-1}\{r_l(x, y, z), \hat{p}_l(x, y, z)\} = \hat{p}_l(x, y, z) + r_l(x, y, z)$$ 3101

$$\hat{p}_l(x, y, z)=\hat{c}_{l-1}([x/2], [y/2], [z/2])$$ 3102

<LoD generation for all octree depth>

Depth N-2 LoD N-2 = {a, b}    Attr coding : a, b

Depth N-1 LoD N-1 = {c, d, e}    Attr coding : c
Inferred : d = a, e = b

Depth N LoD N = {f, g, h, i, j, k, l, m}    Attr coding : g, h, j, l, m
Inferred : f = c, i = d, k = c

FIG. 38

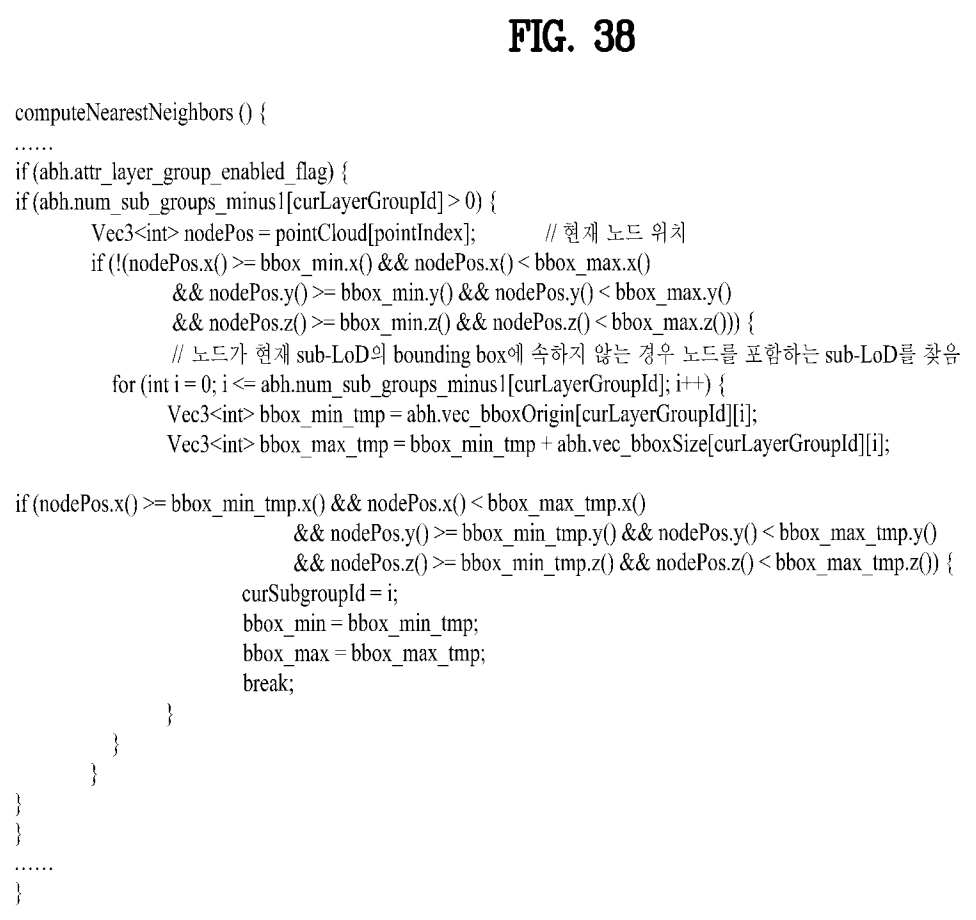

```
computeNearestNeighbors () {
……
if (abh.attr_layer_group_enabled_flag) {
if (abh.num_sub_groups_minus1[curLayerGroupId] > 0) {
        Vec3<int> nodePos = pointCloud[pointIndex];        // 현재 노드 위치
        if (!(nodePos.x() >= bbox_min.x() && nodePos.x() < bbox_max.x()
                && nodePos.y() >= bbox_min.y() && nodePos.y() < bbox_max.y()
                && nodePos.z() >= bbox_min.z() && nodePos.z() < bbox_max.z())) {
                // 노드가 현재 sub-LoD의 bounding box에 속하지 않는 경우 노드를 포함하는 sub-LoD를 찾음
          for (int i = 0; i <= abh.num_sub_groups_minus1[curLayerGroupId]; i++) {
                Vec3<int> bbox_min_tmp = abh.vec_bboxOrigin[curLayerGroupId][i];
                Vec3<int> bbox_max_tmp = bbox_min_tmp + abh.vec_bboxSize[curLayerGroupId][i];

if (nodePos.x() >= bbox_min_tmp.x() && nodePos.x() < bbox_max_tmp.x()
                        && nodePos.y() >= bbox_min_tmp.y() && nodePos.y() < bbox_max_tmp.y()
                        && nodePos.z() >= bbox_min_tmp.z() && nodePos.z() < bbox_max_tmp.z()) {
                    curSubgroupId = i;
                    bbox_min = bbox_min_tmp;
                    bbox_max = bbox_max_tmp;
                    break;
                }
          }
        }
}
}
……
}
```

FIG. 39

```
inline void
updateNearestNeighbor()
{
......
        if (abh.attr_layer_group_enabled_flag) {
                Vec3<int> nodePos = pointCloud[pointIndex1];
                if (!(nodePos.x() >= bbox_min.x() && nodePos.x() < bbox_max.x()
                                && nodePos.y() >= bbox_min.y() && nodePos.y() < bbox_max.y()
                                && nodePos.z() >= bbox_min.z() && nodePos.z() < bbox_max.z())) {
                                return;                    // do not update nearest neighbour
                }
        }
......
        insertNeighbour(
                pointIndex1, norm1, aps.num_pred_nearest_neighbours_minus1, neighborCount,
                neighbors);
}
```

FIG. 40

| attribute data_unit_header( ) { | Descriptor |
|---|---|
| ...... | |
| layer_group_enabled_flag | u(1) |
| if(layer_group_enabled_flag) { | |
| num_layer_groups_minus1 | u(8) |
| layer_group_id | u(8) |
| dependent_slice_flag | u(1) |
| if(dependent_slice_flag) { | |
| ref_slice_id | u(8) |
| ref_layer_group_id | u(8) |
| } | |
| num_layers_minus1 | u(8) |
| layer_group_stream_len_bits | ue(v) |
| layer_group_stream_len | u(v) |
| subgroup_enabled_flag | u(1) |
| if(subgroup_enabled_flag) { | |
| num_subgroups_minus1 | u(8) |
| subgroup_id | u(8) |
| ref_subgroup_id | u(8) |
| } | |
| num_points_bits_minus1 | ue(v) |
| num_points | u(v) |
| subgroup_bbox_origin_bits_minus1 | ue(v) |
| for(i=0; i<3; i++) | |
| subgroup_bbox_origin[i] | u(v) |
| subgroup_bbox_size_bits_minus1 | ue(v) |
| for(i=0; i<3; i++) | |
| subgroup_bbox_size[i] | u(v) |
| } | |
| ...... | |
| } | |

low resolution point cloud
(with attribute)

full resolution point cloud

G-PCC decoder

G-PCC decoder

Not for presentation
but for assisting attribute decoding partial attribute bitstream partial octree bitstream Attribute bitstream Geometry bitstream Increasing
octree depth
(Root to leaf)

POINT CLOUD DATA TRANSMISSION DEVICE AND METHOD, AND POINT CLOUD DATA RECEPTION DEVICE AND METHOD

CROSS-REFERENCE TO RELATED APPLICATIONS

This application is a National Stage application under 35 U.S.C. § 371 of International Application No. PCT/KR2022/010267, filed on Jul. 14, 2022, which claims the benefit of Korean Application No. 10-2021-0092513, filed on Jul. 14, 2021. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding point cloud data, and transmitting a bitstream including the point cloud data. In another aspect of the present disclosure, a method of receiving point cloud data may include receiving a bitstream including point cloud data, and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 26 illustrates an attribute parameter set (APS) according to embodiments.

FIG. 29 illustrates attribute coding according to embodiments.

FIG. 31 illustrates attribute prediction and attribute reconstruction according to embodiments.

FIG. 38 illustrates sub-LoD search according to embodiments.

FIG. 39 illustrates a method for updating nearest neighbors according to embodiments.

FIG. 40 illustrates an attribute data unit header according to embodiments.

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
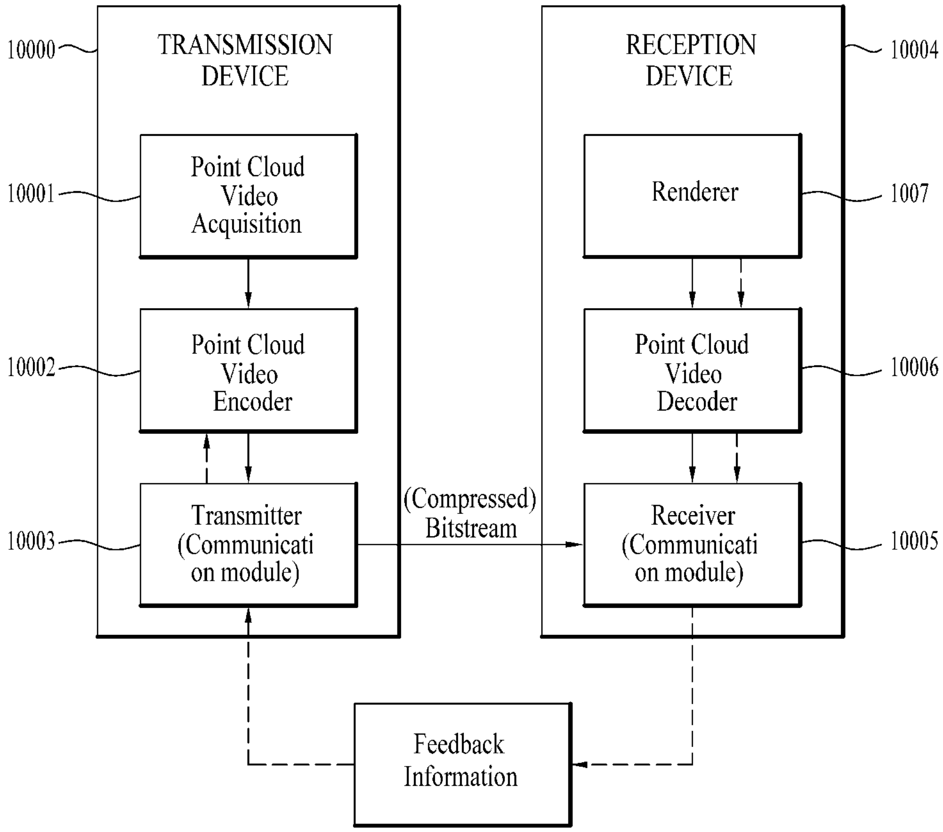
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
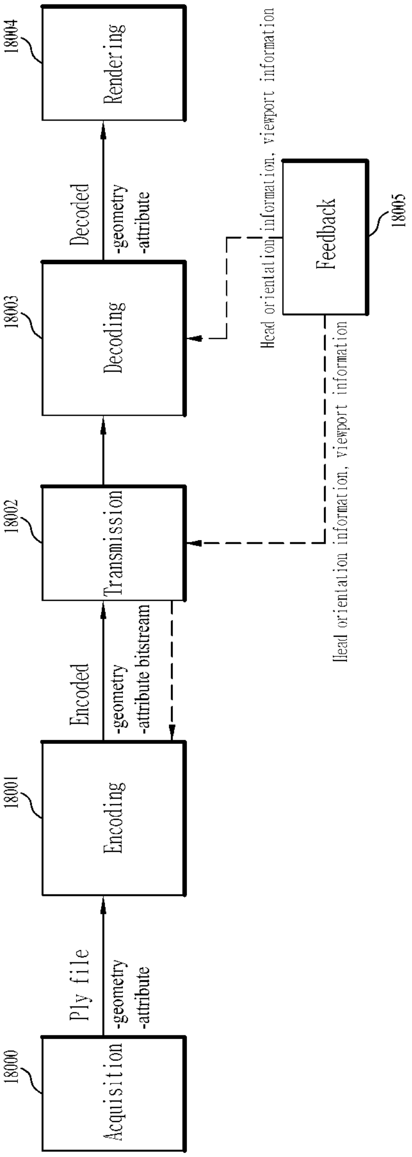
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
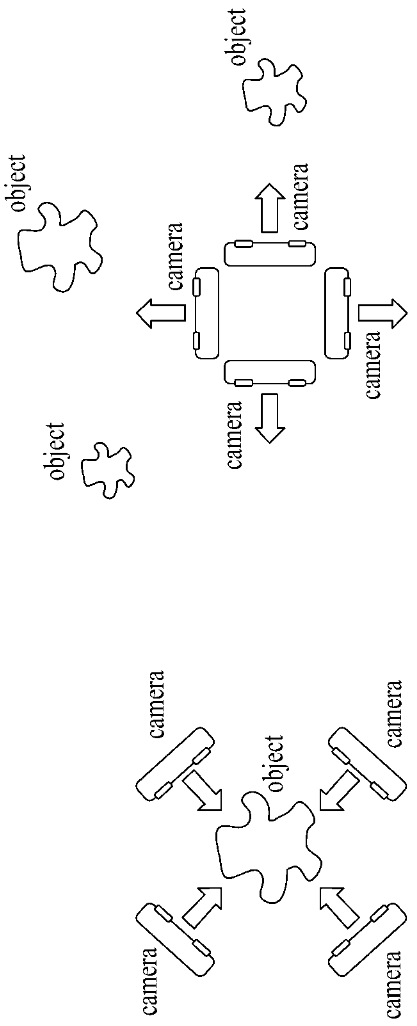
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
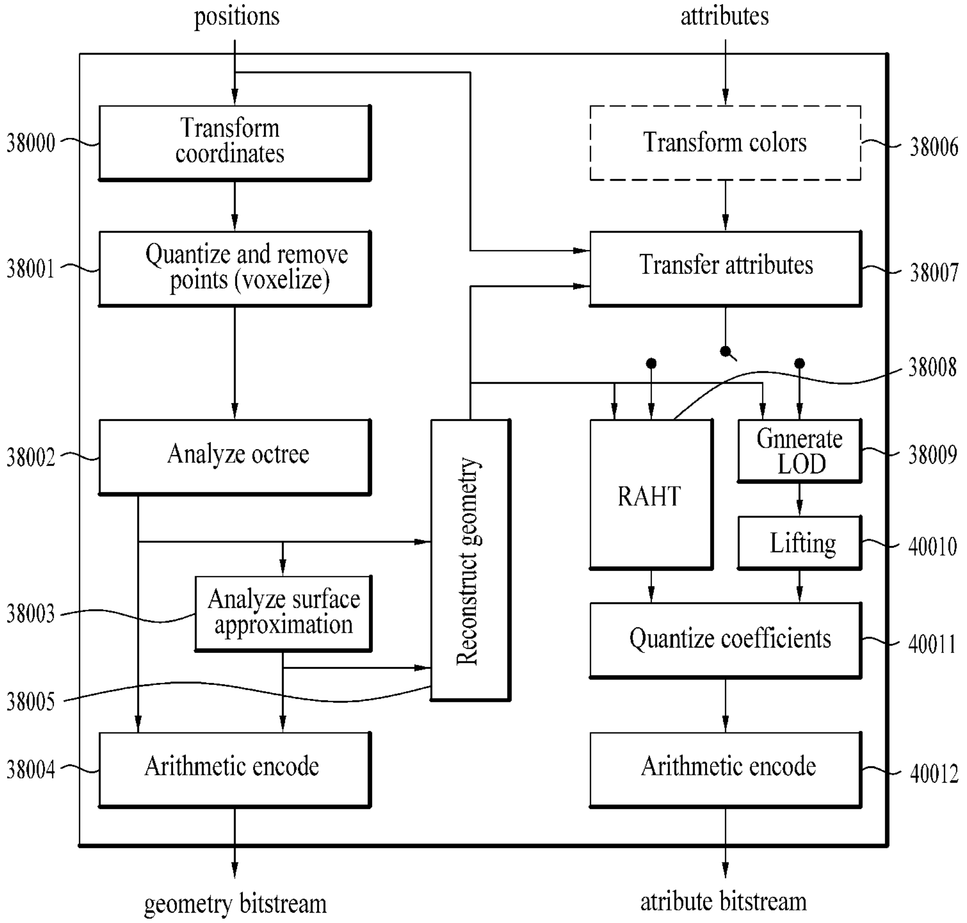
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LoD generator (Generate LoD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LoD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LoD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LoD generator 40009 according to the embodiments generates a level of detail (LoD) to perform prediction transform coding. The LoD according to the embodiments is a degree of detail of point cloud content. As the LoD value decrease, it indicates that the detail of the point cloud content is degraded. As the LoD value increases, it indicates that the detail of the point cloud content is enhanced. Points may be classified by the LoD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a nonvolatile memory (e.g., one or more magnetic disk storage devices, flash memory devices, or other nonvolatile solid-state memory devices).

Figure 5:
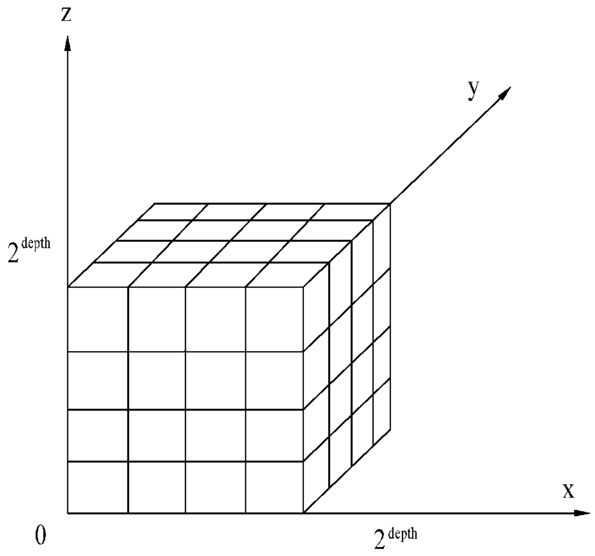
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
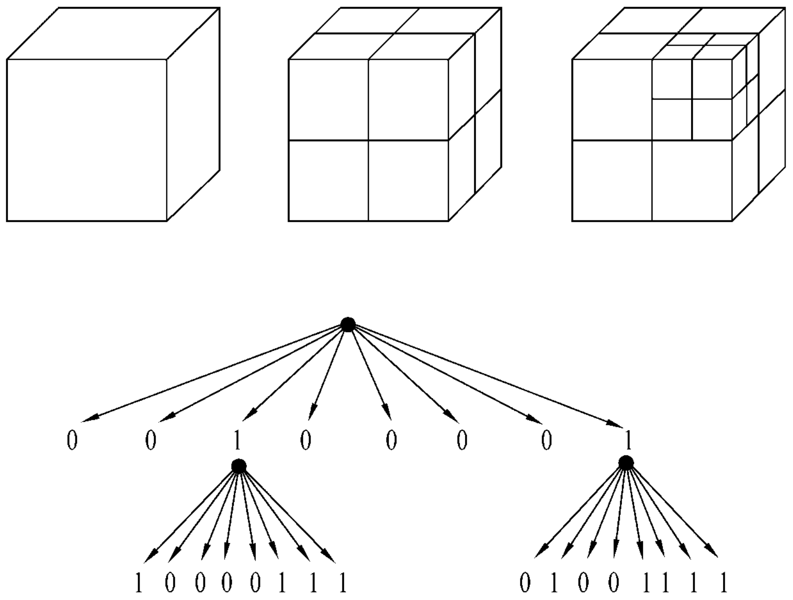
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d = \mathrm{Ceil}\left(\mathrm{Log2}\left(\mathrm{Max}\left(x_n^{int}, y_n^{int}, z_n^{int}, n = 1, \ldots , N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix}\mu_x\\ \mu_y\\ \mu_z\end{bmatrix} = \frac{1}{n}\sum_{i=1}^{n}\begin{bmatrix}x_i\\ y_i\\ z_i\end{bmatrix}; \quad \text{i)}$$

$$\begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix}; \quad \text{ii)}$$

$$\begin{bmatrix}\sigma_x^2\\ \sigma_y^2\\ \sigma_z^2\end{bmatrix} = \sum_{i=1}^{n}\begin{bmatrix}\bar{x}_i^2\\ \bar{y}_i^2\\ \bar{z}_i^2\end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
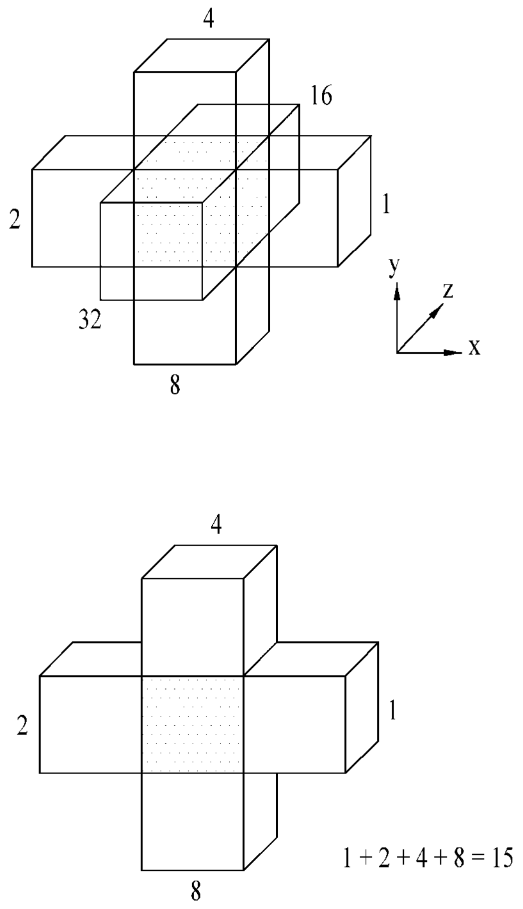
FIG. 7 shows an example of a neighbor node pattern according to embodiments.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
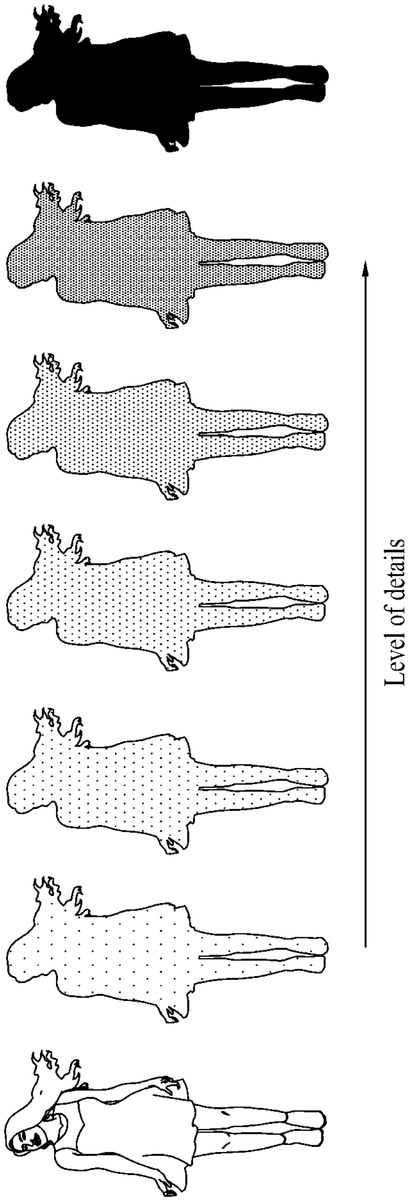
FIG. 8 illustrates an example of point configuration in each LoD according to embodiments.

FIG. 8 illustrates an example of point configuration in each LoD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LoD generator 40009) may classify (reorganize) points by LoD. The figure shows the point cloud content corresponding to LoDs. The leftmost picture in the figure represents original point cloud content. The second picture from the left of the figure represents distribution of the points in the lowest LoD, and the rightmost picture in the figure represents distribution of the points in the highest LoD. That is, the points in the lowest LoD are sparsely distributed, and the points in the highest LoD are densely distributed. That is, as the LoD rises in the direction pointed by the arrow indicated at the bottom of the figure, the space (or distance) between points is narrowed.

Figure 9:
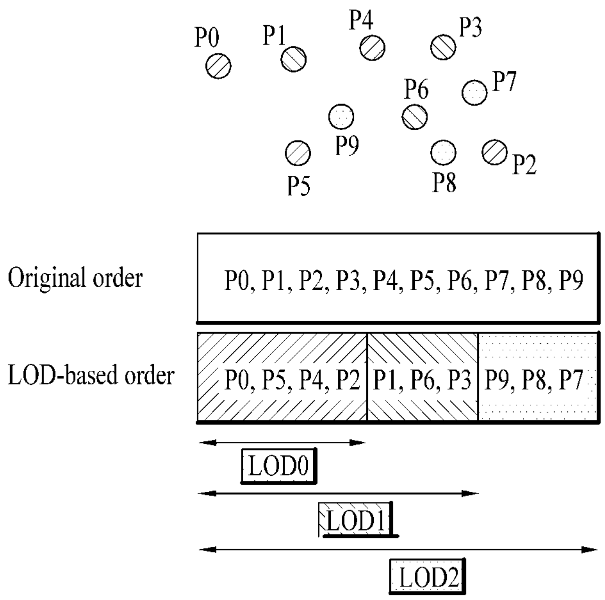
FIG. 9 illustrates an example of point configuration in each LoD according to embodiments.

FIG. 9 illustrates an example of point configuration for each LoD according to embodiments.

As described with reference to FIGS. 1 to 8, the point cloud content providing system, or the point cloud encoder (for example, the point cloud video encoder 10002, the point cloud encoder of FIG. 4, or the LoD generator 40009) may generates an LoD. The LoD is generated by reorganizing the points into a set of refinement levels according to a set LoD distance value (or a set of Euclidean distances). The LoD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LoD generation. In FIG. 9, the LoD based order represents the order of points according to the LoD generation. Points are reorganized by LoD. Also, a high LoD contains the points belonging to lower LoDs. As shown in FIG. 9, LoD0 contains P0, P5, P4 and P2. LoD1 contains the points of LoD0, P1, P6 and P3. LoD2 contains the points of LoD0, the points of LoD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LoD value of each point, indexing information about neighboring points present within a set distance for each LoD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE Attribute prediction residuals inverse quantization pseudo code

```
int PCCInverseQuantization(int value, int quantStep) {
if( quantStep == 0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LoD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ h_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{3x+1,y,z}}$. The root node is created through the $g_{1_{0,0,0}}$ and $g_{1_{0,0,1}}$ as follows.

$$\begin{bmatrix} g^{DC} \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
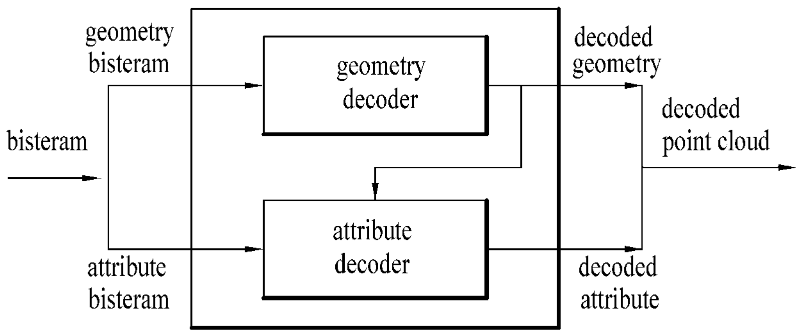
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
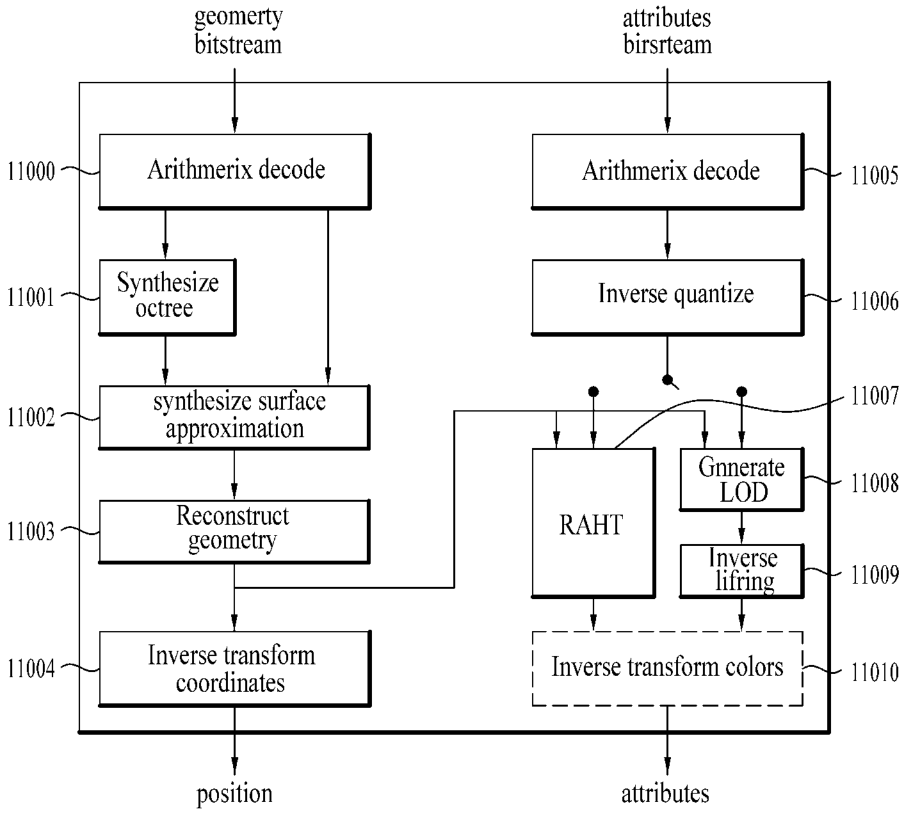
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LoD generator (Generate LoD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LoD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LoD generator 11008, and/or the inverse lifter 11009 may process the reconstructed geometry and the inversely quantized attributes. As described above, the RAHT transformer 11007, the LoD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
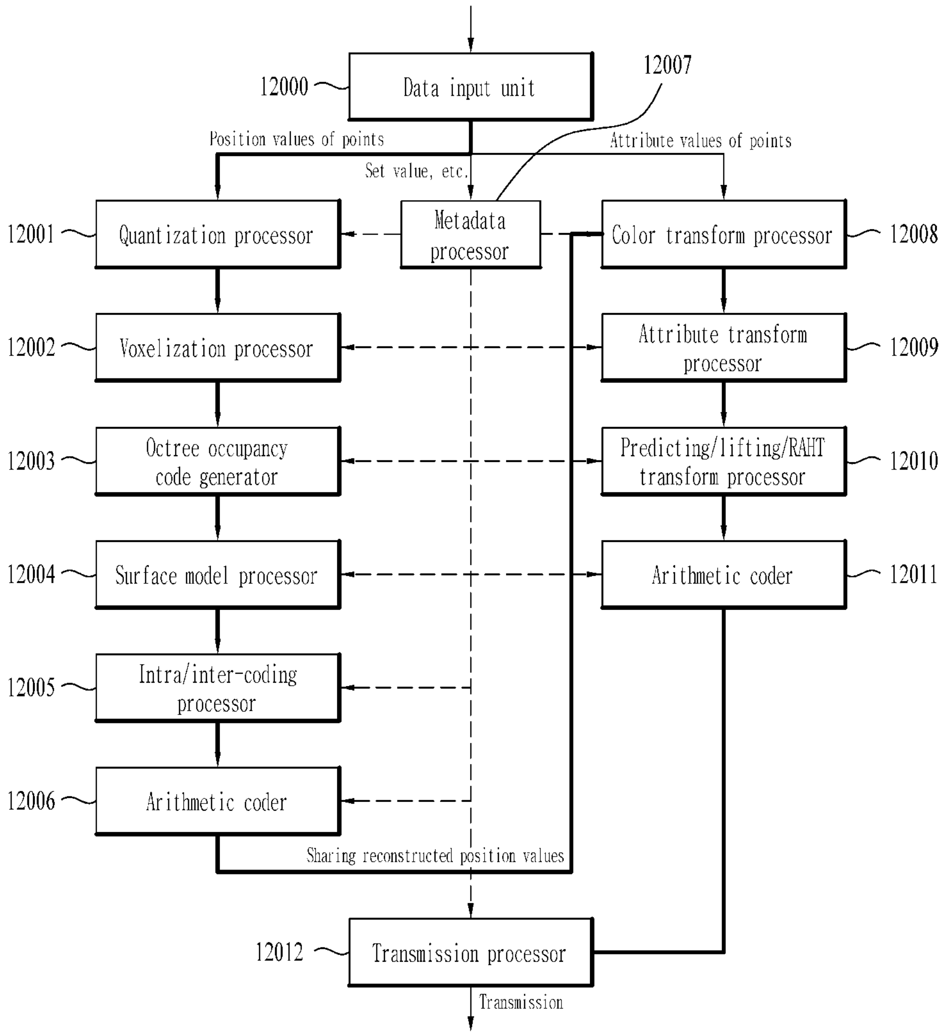
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LoD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
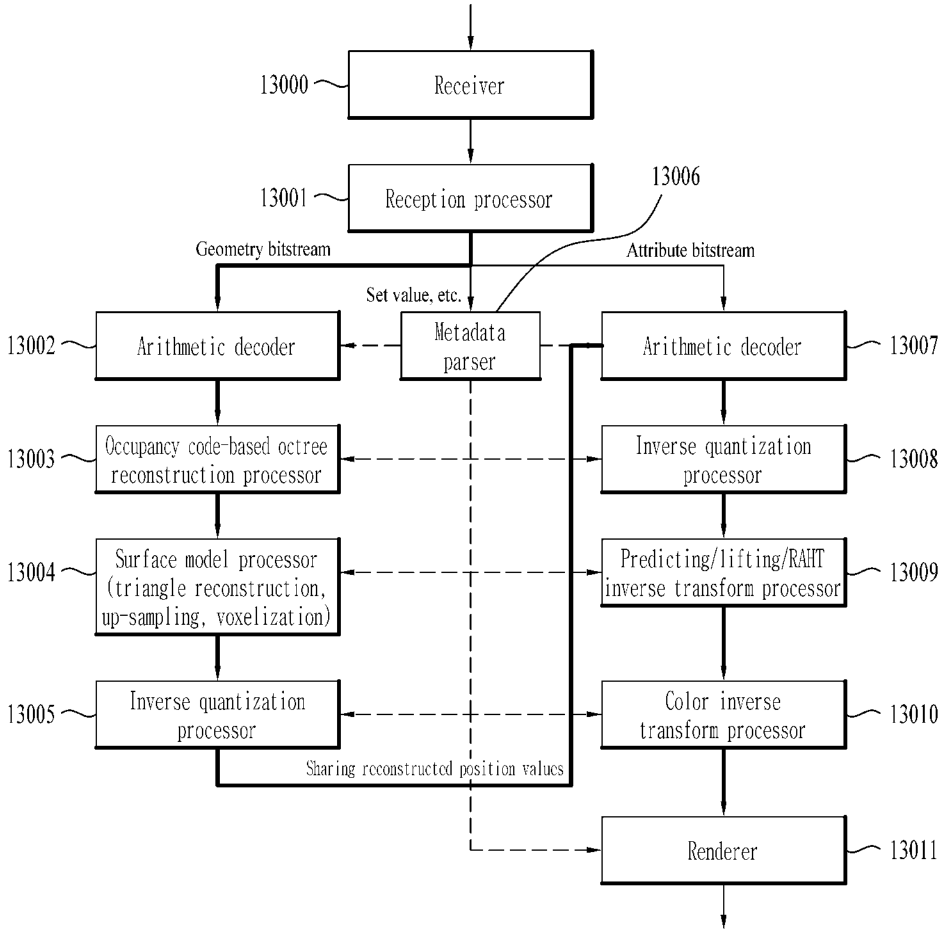
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LoD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
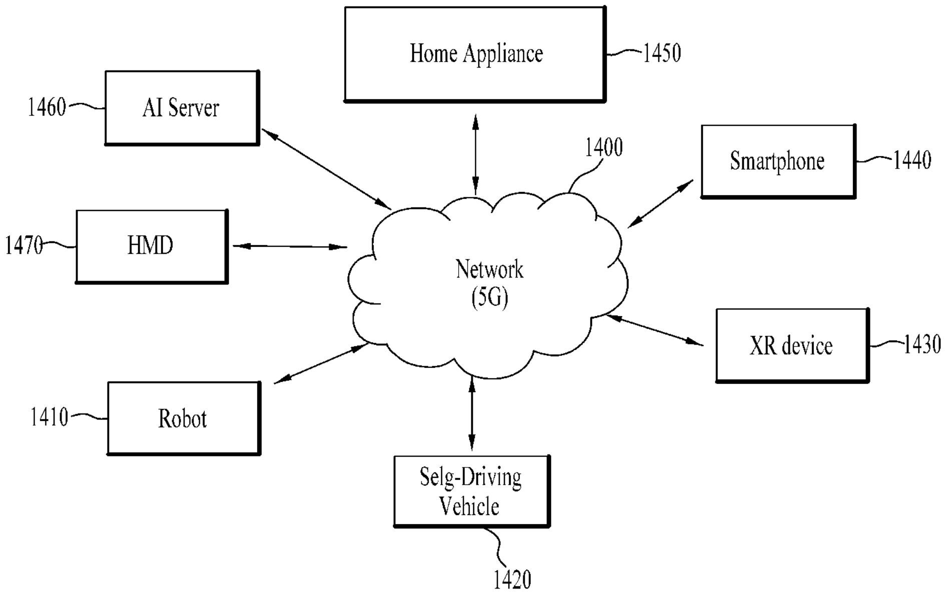
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
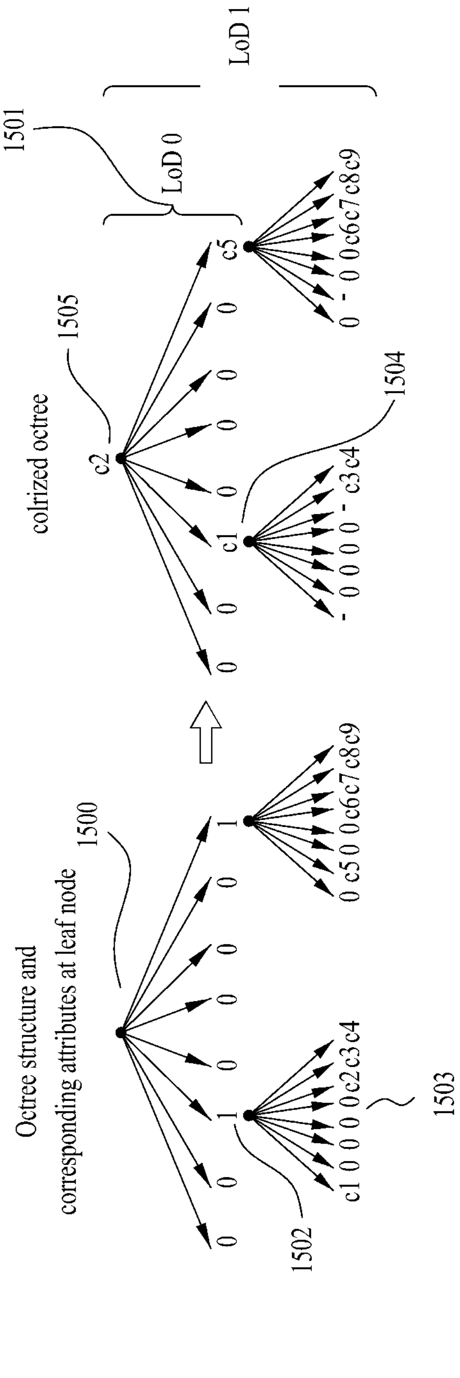
FIG. 15 illustrates an octree-based levels of detail (LoDs) according to embodiments.
Figure 16:
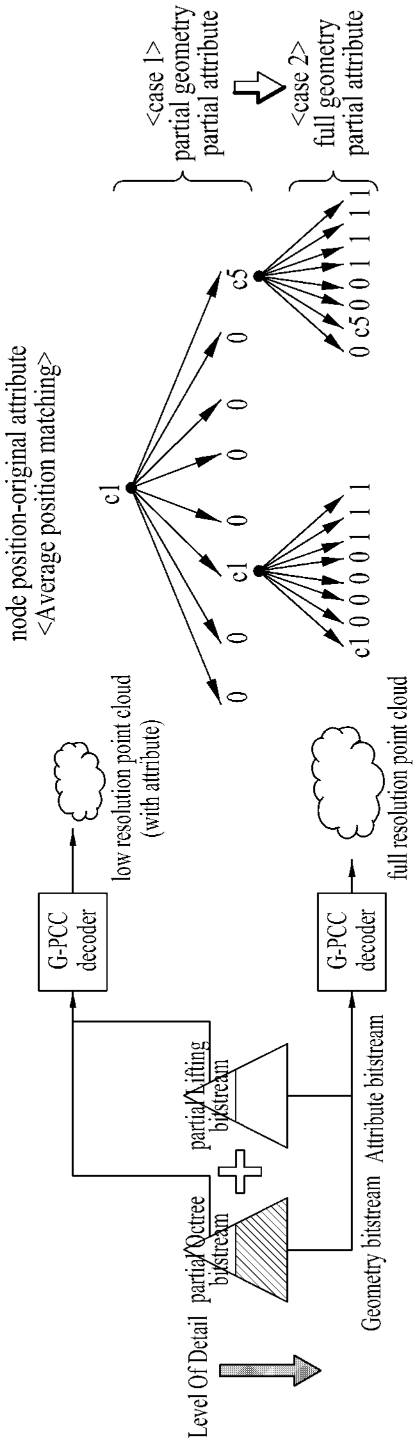
FIG. 16 illustrates an example of scalable point cloud compression according to embodiments.
Figure 23:
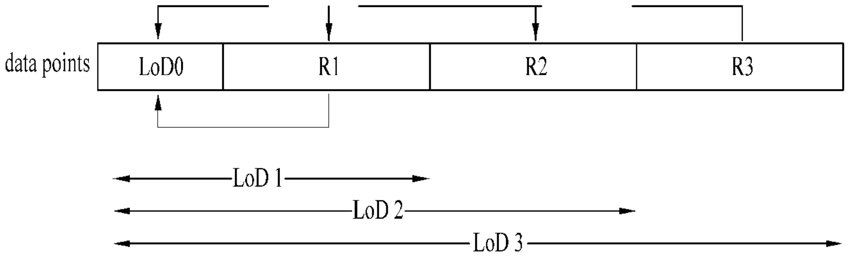
FIG. 23 illustrates fast prediction according to embodiments.
Figure 24:
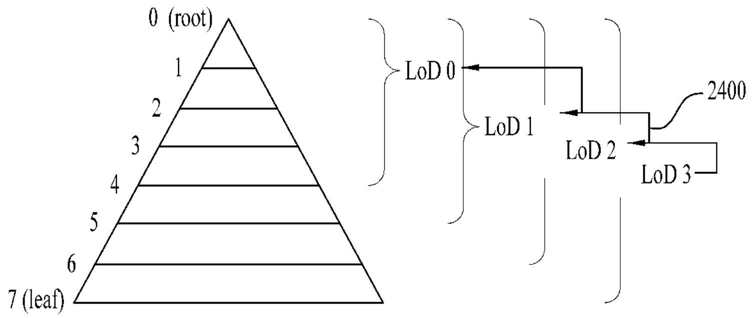
FIG. 24 illustrates neighbor search based on an octree and LoDs according to embodiments.
Figure 25:
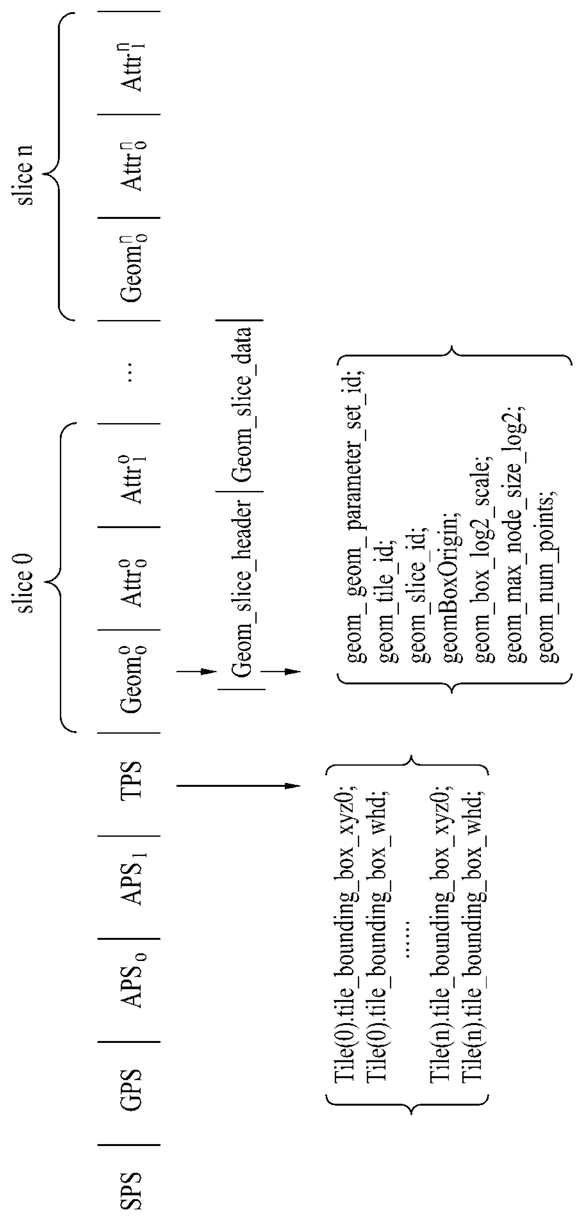
FIG. 25 illustrates a bitstream including point cloud data according to embodiments.
Figure 27:
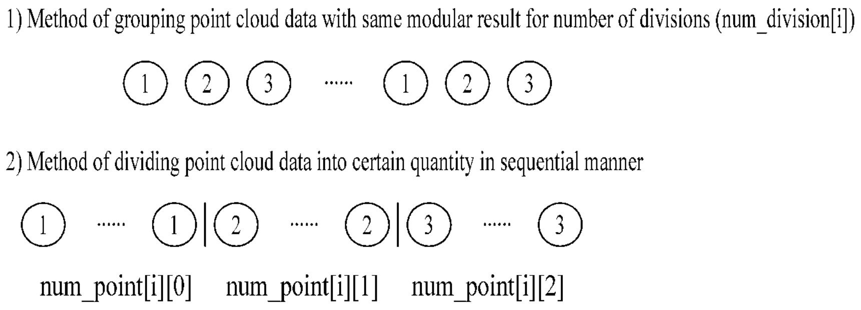
FIG. 27 illustrates division types according to embodiments.
Figure 28:
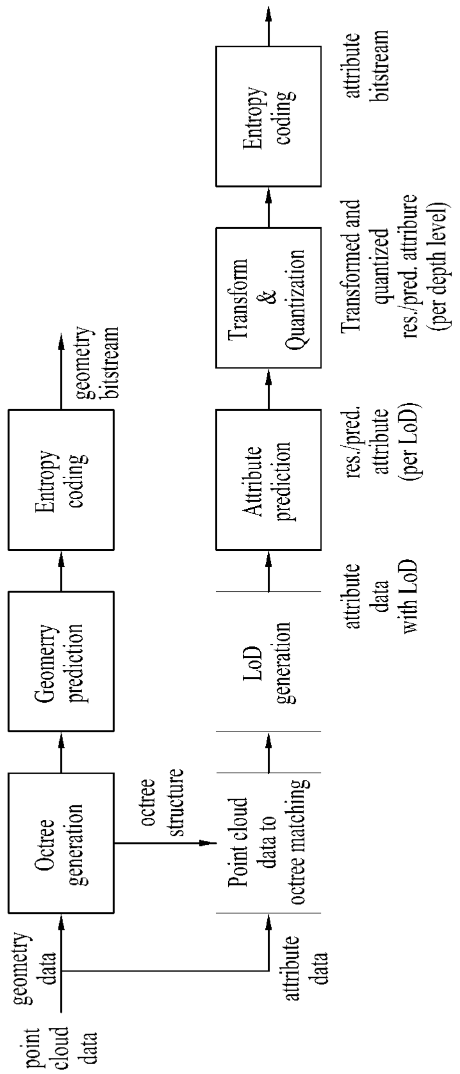
FIG. 28 illustrates a point cloud data transmitting device according to embodiments.
Figure 41:
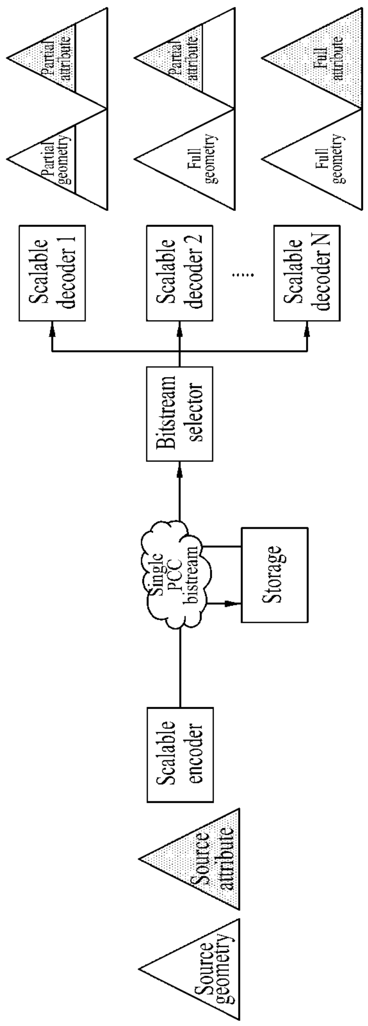
FIG. 41 illustrates a point cloud data encoder/decoder according to embodiments.
Figure 43:
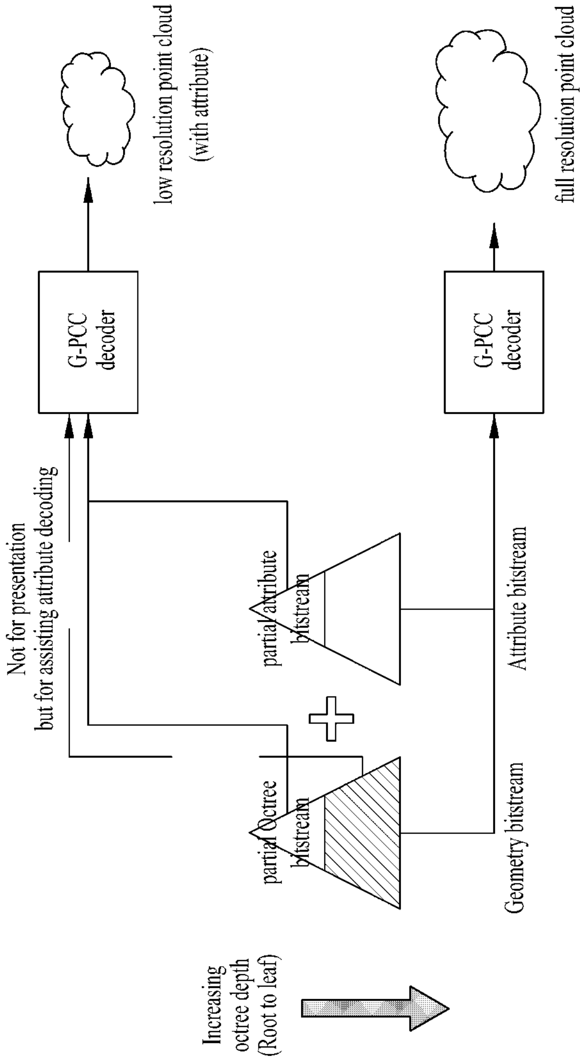
FIG. 43 illustrates transmission of point cloud data depending on octree levels according to embodiments.

A method/device for transmitting point cloud data according to embodiments is interpreted as terms referring to the transmitting device 10000, point cloud video encoder 10002, or transmitter 10003 of FIG. 1, the acquisition 20000/encoding 20001/transmission 20002 of FIG. 2, the encoder of FIG. 4, the transmitting device of FIG. 12, the device of FIG. 14, encoding of FIGS. 15 to 16, octree-based encoding of FIGS. 17 to 20, LoD-based encoding of FIGS. 21 to 24, bitstream and parameter generation of FIGS. 25 and 26, division-based encoding of FIG. 27, an encoder of FIG. 28, subgroup encoding of FIGS. 32 to 39, parameter generation of FIG. 40, scalable encoding of FIG. 41, partial transmission of FIG. 43, and so on.

A method/device for receiving point cloud data according to embodiments is interpreted as terms referring to the reception device 10004, receiver 10005, or point cloud video decoder 10006 of FIG. 1, the transmission 20002/decoding 20003/rendering 20004 of FIG. 2, the decoder of FIGS. 10 and 11, the reception device of FIG. 13, the device of FIG.

Figure 30:
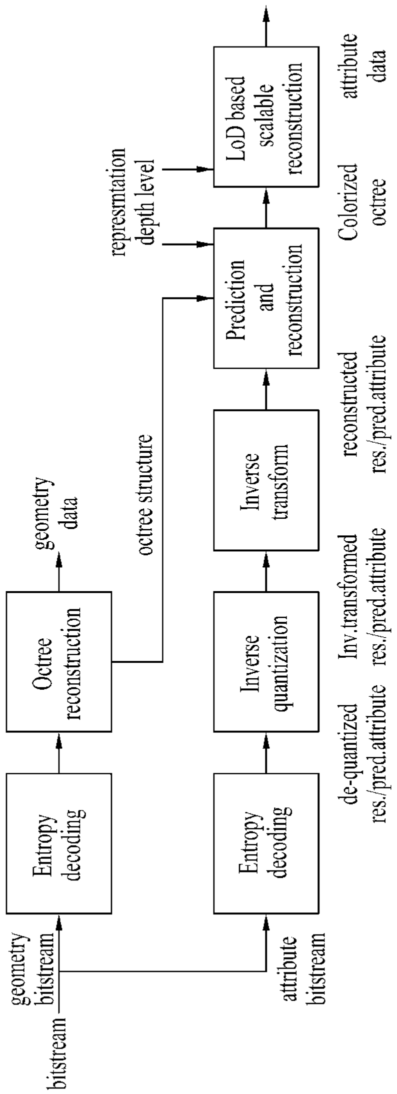
FIG. 30 illustrates a point cloud data receiving device according to embodiments.

14, octree structure-based decoding of FIGS. 15 and 16, octree-based decoding of FIGS. 17 to 20, LoD-based decoding of FIGS. 21 to 24, bitstream parsing of FIGS. 25 and 26, division-based decoding of FIG. 27, a decoder of FIG. 30, subgroup decoding of FIGS. 32 to 39, parameter parsing of FIG. 40, scalable decoding of FIG. 41, partial reception of FIG. 43, and so on.

In addition, the methods/devices for transmitting and receiving point cloud data according to the embodiments may be simply referred to as methods/devices according to the embodiments.

According to embodiments, geometry data, geometry information, and position information that constitute point cloud data are interpreted to have the same meaning. Attribute data, attribute information, and attribute data that constitute point cloud data are also interpreted to have the same meaning.

The methods/devices according to the embodiments relates to improved point cloud data scalable attribute coding.

FIG. 15 illustrates an octree-based LoDs according to embodiments.

Specifically, FIG. 15 shows a process of generating an LoD for attribute data based on the octree of geometric data by the transmitting device 10000, point cloud video encoder 10002, or transmitter 10003 of FIG. 1, the acquisition 20000/encoding 20001/transmission 20002 of FIG. 2, the encoder of FIG. 4, the transmitting device 10000 of FIG. 12, the devices of FIG. 14, the encoder of FIG. 28. In addition, the attribute data may be decoded based on the LoD of FIG. 15 by the reception device 10004, receiver 10005, or point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 30, the scalable decoder of FIG. 15, and so on.

The methods/devices according to the embodiments may configure attribute data for attribute coding based on the octree of the geometry structure (geometry data) of point cloud data and generate a LoD from the reconstructed geometry data and attribute data. The methods/devices according to the embodiments may include a method of matching point cloud data based on information on the locations of octree nodes. Here, matching refers to using a point-paired octree, where the point-paired octree has a structure in which attribute data and geometry data (position) are matched with octree nodes. Additionally, the methods/devices according to the embodiments include a method of efficiently performing attribute coding by applying such octree nodes to configure LoDs. According to these embodiments, it is possible to transmit or output low-resolution or sub-sampled point cloud data based on octree nodes to which attribute data are assigned.

Referring to FIG. 15, an octree 1500 may be generated by a geometry encoder and then structured by an attribute encoder into a LoD-based octree. The octree may have a hierarchical structure based on LoD levels 1501. A node belonging to a specific LoD level may have a value of 0 or 1 1502 depending on the presence of occupied bits. A node with occupied bits has child nodes at the next LoD level. As the LoD level descends to the leaf nodes, an octree structure including nodes associated with attribute data (e.g., color values) 1503 may be generated. In the octree structure, the attributes of the child nodes at the next LoD level are matched with the attributes of the parent node, which may be referred to as sub-sampling. For example, for a node 1504, the most similar attributes from its child nodes may be matched with the attributes of the parent node 1504. For a node 1505, the most similar attributes from its child nodes may be allocated to the attributes of the parent node 1505.

FIG. 16 illustrates an example of scalable point cloud compression according to embodiments.

The methods/devices according to the embodiments may compress point cloud data in a scalable manner as shown in FIG. 16 and may also restore the point cloud data in a scalable manner according to a method in association with FIG. 16.

Scalable point cloud compression according to embodiments may provide a full geometry and partial attributes. For example, referring to FIG. 15, geometry data may include LoD levels down to the position of leaf nodes, while attribute data may include attributes up to the intermediate LoD level. In the case of scalable point cloud compression, the actual point positions of decoded attributes are matched based on additional geometry information, which may be used to create a sub-sampled point cloud data representation.

Referring to case 1 of FIG. 16, the methods/devices according to the embodiments may partially configure geometry data up to a specific LoD level and may also partially configure attribute data associated with the positions of the geometry data up to a specific LoD level. The position of nodes may be matched with the original attributes. The position of nodes may also be matched with the average values of points.

Referring to case 2 of FIG. 16, the methods/devices according to the embodiments may configure geometry data up to the level of leaf nodes and partially configure attribute data up to a specific LoD level. Attribute data associated with the positions up to the leaf node level may be partially configured. In this case, it is possible to match the same attribute data between parent and child nodes, and the attribute data of child nodes may be sub-sampled and set as the attribute data of the parent node.

The embodiments include a method of compressing data composed of point clouds. Specifically, the present disclosure propose a method of layering information on the attribute of point clouds based on an octree structure and a method of applying attribute coding based thereon.

Referring to FIG. 4 and FIG. 11, point cloud data is composed of the position (geometry) (e.g., XYZ coordinates) and attributes (e.g., color, reflectance, intensity, grayscale, opacity, etc.) of each data. In point cloud compression (PCC), octree-based compression is used to efficiently compress the unevenly distributed distribution characteristics in a three-dimensional (3D) space, and attribute information is compressed based thereon. Hereinafter, a flowchart of a PCC transmitter and receiver will be described. The operations proposed in the present disclosure may be processed by each component of the PCC transmitter and receiver.

The methods/devices according to the embodiments may generate a LoD based on the distance between points based on attribute coding (refer to FIG. 9) and may sequentially encode attributes. In this case, a process of finding surrounding points needs to be preceded. A commonly used method therefor is the nearest neighbor search. While the nearest neighbor search has the advantage of accurately finding neighboring points, the nearest neighbor search has the disadvantage of taking a long time to execute, which may cause delays in a systems that requires high-speed processing. The methods/devices according to the embodiments may address potential delays that may occur in such a system.

The methods/devices according to the embodiments may include an octree-based LoD configuration method and an attribute coding method based on a configured LoD.

When point cloud data is structured based on octree colorization, it is possible to match point cloud data that exists in positions similar to those of octree nodes based on distance similarity. A colorized octree structure configured as described above may be regarded as an octree that matches the point cloud data. According to this structure, point cloud data may be distinguished based on LoDs, and this may be used for prediction lift transform, which is one of the attribute coding scheme.

Referring to FIG. 8, LoDs may be configured such that points in each LoD are distributed at distances greater than or equal to a reference distance. In this case, the reference distance is designed to decrease as the LoD increases. Therefore, as the LoD increases, the distances between points become shorter. When point cloud data is configured based on LoDs, if point cloud data with different complexities, resolutions, and/or qualities are preconfigured, it is possible to transmit point cloud data subsets with different details depending on the application field.

Figure 17:
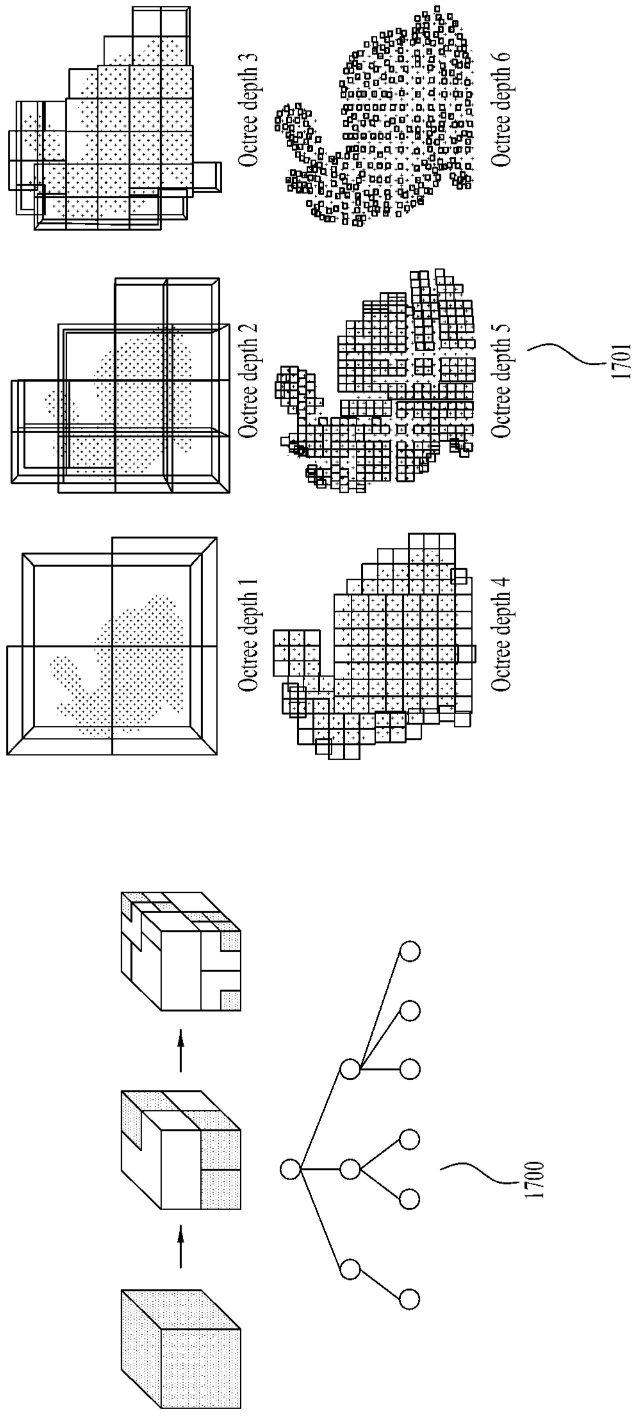
FIG. 17 illustrates octree-based LoDs generation according to embodiments.

FIG. 17 illustrates octree-based LoD generation according to embodiments.

The methods/devices according to the embodiments may represent LoDs based on the octree of point cloud data.

In the case of an octree structure used in point cloud geometry coding, as the depth level increases (direction from the root to the leaf), the bounding box may be divided into smaller units. If the bounding box is further divided into smaller units to find a unit cube and if an area with valid information is further divided into smaller units in the next step, locations with the valid information may be found at finer granularity. That is, as the octree depth level increases, the detail of point cloud data gradually increases, which may be viewed as having similar directionality to LoD-based point cloud data composition.

Referring to reference number 1700, the bounding box corresponds to the root level of the octree and may include the largest area. By subdividing the bounding box into smaller units, parent-child nodes (box units) may be hierarchically generated.

Referring to reference number 1701, point cloud data may be represented by partitioning a space from larger bounding boxes to smaller bounding boxes based on objects in the point cloud data. As the octree depth increases from 1 to 6, the size of the bounding boxes decreases, which may allow for creation of nodes that includes points and nodes that do not includes points.

Figure 18:
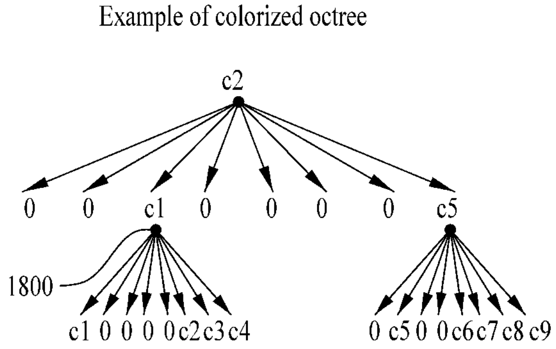
FIG. 18 illustrates octree colorization according to embodiments.

FIG. 18 illustrates octree colorization according to embodiments.

The methods/devices according to the embodiments may represent point cloud data based on octree colorization.

Octree Colorization

Considering that the detail gradually increases as the octree depth level increases, it is possible to apply scalable coding and representation in relation to the octree depth level and LoD level. In this case, when the detail increases based on an octree, there may be two differences compared to when a LoD is used.

1) The positions of occupied nodes (areas where points exist, nodes, bounding boxes, etc.) at a specific octree depth level represent approximate values and/or representative values of data located in similar positions, rather than information on the position of actual point cloud data.
2) There are no attributes that match each node of the octree.

To address these two issues, an octree colorization method for matching point cloud data with an octree structure may be used. The attributes of actual point cloud data and positions thereof may be matched with the octree structure as shown in FIG. 18.

A node 1800 is an occupied node, and the color (attribute) of point cloud data may be matched with the node 1800. The node 1800 may represent position-color matching FIG. 19 illustrates octree colorization according to embodiments.

Figure 19:
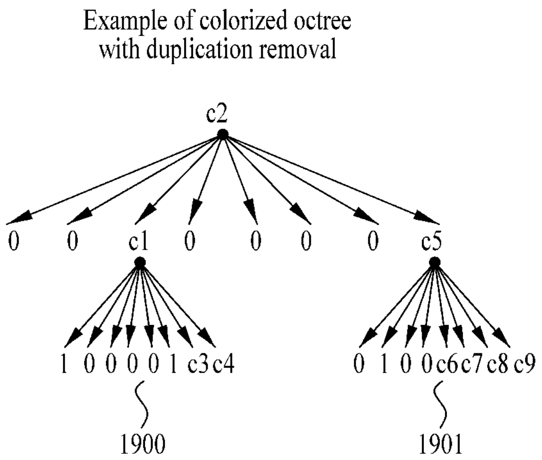
FIG. 19 illustrates octree colorization according to embodiments.

Specifically, FIG. 19 shows the same octree colorization as in FIG. 18.

There may be duplicate information between points matched with leaf nodes and points matched with a higher octree depth level. As shown in FIG. 19, the duplicate information may be removed from the leaf nodes, which allows for one-to-one mapping between input point cloud data and point cloud data structured based on an octree.

If nodes 1900 and 1901 have the same color as the parent node (refer to FIG. 18), the methods/devices according to the embodiments may remove the duplicate colors at the positions of the nodes 1900 and 1901.

Considering the colorized octree generated through the above process from the perspective of LoD generation, the following features may be taken into consideration.

1) As the octree depth level increases, the distance between nodes may decrease. This may be associated with the characteristic that as the LoD increases, the distance between points decreases.
2) As the octree depth level increases, the number of points matched with actual positions and/or attributes may increase. It may be considered that as the octree depth increases (in the root to leaf direction), the detail of point cloud data increases.

According to these characteristics, an increase in the octree depth level may be matched with an increase in the LoD. The LoD may be generated according to the following method.

LoD Generation

The methods/devices according to the embodiments may use an octree structure to generate LoDs. A LoD generation process is performed based on the structural characteristics of an octree where the distance between nodes remains constant for each octree depth level and decreases as the octree depth level increases. The proposed LoD generation process includes: 1) a method of collecting point cloud data sampled according to certain criteria for the LoD generation (generation of a retained set); and 2) a method of generating LoDs based on the retained set. In this case, octree colorization, which is a process for matching the attributes and positions of point cloud data with octree nodes, may be performed as a preliminary step of the LoD generation.

The methods/devices according to the embodiments may include and perform the following steps.

Step 1. Sampling based on an octree structure.

Step 2. Generating a retained set.

Step 3. Generating a LoD set.

Step 4. Performing fast prediction based on the octree structure.

Hereinafter, each step will be described in detail with reference to the drawings.

Sampling Strategy Using Octree Structure

According to embodiments, when LoDs associated with an octree depth layer structure are configured, the distance between points at the octree depth level may be used instead of the reference distance (dist2) typically used for LoD generation. A LoD configuration method according to embodiments involves configuring a reference distance that is inversely proportional to a LoD number, sub-sampling the closest (or first) point among points located beyond a certain distance, and including the sub-sampled point in a new LoD. In this case, since the distances between all points need to be compared according to each distance criterion, various methods (e.g., sub-sampling method based on Morton code order) may be used to reduce the time required for comparing the distances between all points. Further, to address these issues, it may be assumed that the methods/devices according to the embodiment may configure LoDs based on an octree, and points matched to each node may be separated by at least the size of the node at the octree depth level. Additionally, it may be considered that due to the octree structure, points with a certain distance are sampled. For example, for an octree structure with the root node at depth 0 and leaf nodes at depth N, the minimum distance between nodes at an n-th depth (where n<N) may be considered as 2ˆn. In this case, points matched to occupied nodes at each octree depth level may be considered as points sampled for the corresponding octree depth level. According to the embodiments, the minimum distance between nodes at the n-th depth (where n>0) may be 2ˆ(N−n).

In embodiments, the term "octree" may be interpreted to encompass not only an octree with 8 sub-nodes but also a hierarchical tree with various numbers of nodes.

Figure 20:
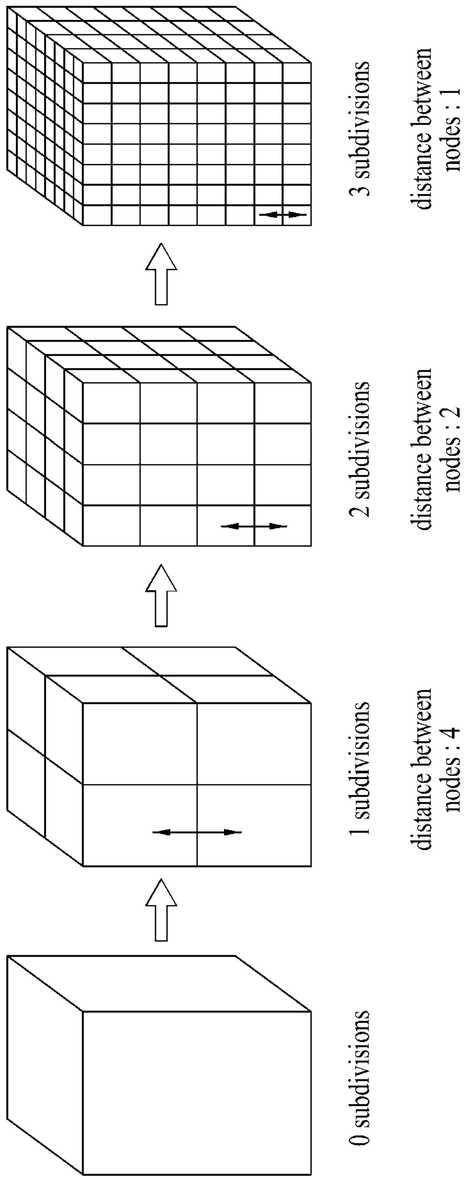
FIG. 20 illustrates nodes according to embodiments.

FIG. 20 illustrates nodes according to embodiments.

Specifically, FIG. 20 shows a process for dividing nodes in an octree depending on depth levels. In FIG. 20, a node 2000 represents a node before division, and the node 2000 may be divided into 8 nodes 2001 at the next depth. The nodes 2001 may have a minimum distance of 2ˆ2=4 therebetween. The nodes 2001 are further divided at the next depth level, and nodes 2002 may have a minimum distance of 2 therebetween. Nodes 2003 may have a minimum distance of 1 therebetween.

According to the embodiments, if there are four octree depth levels, nodes at the first depth may have a minimum distance of 2ˆ(4−1), nodes at the second depth may have a minimum distance of 2ˆ(4−2), and nodes at the third depth may have a minimum distance of 2ˆ(4−3).

Generation of Retained Set

In the LoD structure, a higher LoD includes all points of a lower LoD. To configure each LoD, a set of newly added point cloud data compared to previous LoDs is defined as a retained set. When LoDs are generated based on an octree structure, the LoD may be defined to increase in the direction that the detail increases, that is, in the direction that the octree depth level increases. Accordingly, newly added octree depth layers may be considered as part of the retained set. In this case, various methods may be considered to configure the retained set as follows.

1) Points sampled for one or multiple octree depth levels may be considered as data belonging to the retained set. In other words, a set of points sampled for one or multiple octree depth levels (matched with occupied nodes) may be considered as part of the LoD retained set.

2) Points sampled for one octree depth level may also be divided into multiple LoD retained sets based on predetermined criteria. In this case, various criteria may be considered to divide one octree depth level For example, when one octree depth level is divided into M retained groups, the following cases may be considered.

(1) A case in which data in a set is arranged into M sets with consecutive Morton codes.

(2) A case in which those with the same remainder when dividing Morton code order indices by M are gathered.

(3) A case in which those grouped as sibling nodes are grouped together. Such a method may be signaled separately.

3) If necessary, a collection of subsets of points sampled from multiple octree depth levels may be considered as the retained set.

Figure 21:
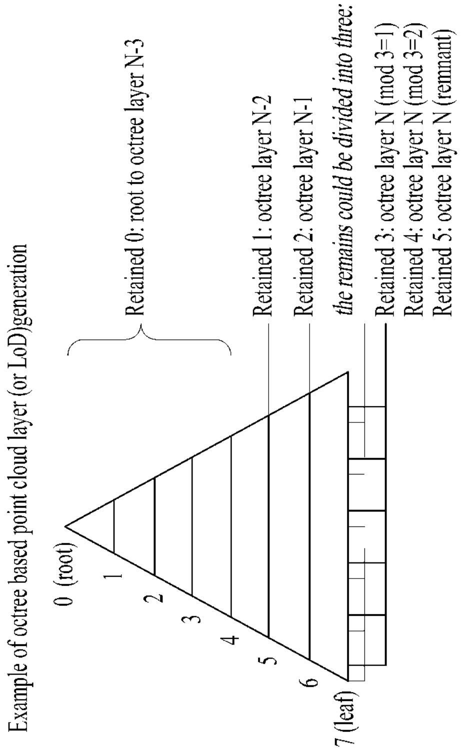
FIG. 21 illustrates generation of a retained set according to embodiments.

FIG. 21 illustrates generation of a retained set according to embodiments.

The methods/devices according to the embodiments may create a retained set for LoDs as described above.

The methods/devices according to the embodiments may generate an octree based on geometry data and also generate a data set for a LoD configuration to generate octree-based LoDs.

For example, when there are octree depth levels from 0 to 7 (from the root node to leaf nodes), point cloud data belonging to one or more depth levels may be generated as a retained set as shown in FIG. 21. Retained data 0 may include point cloud data belonging to nodes in octree depth levels 0 to 4. Retained data 1 may include point cloud data belonging to octree depth level 5. Retained data 2 may include point cloud data belonging to octree depth level 6. In octree depth level 7, point cloud data belonging to nodes at the corresponding depth may be further divided to create additional sets. In this example, octree depth level 7 represents the leaf nodes and may be further divided into three additional sets. As described above, the indices of Morton codes of points belonging to level 7 may be divided by a divisor of 3, and points with the same remainder may be created as a set. Retained data 3 includes points with a modulo 3 result of 1. Retained data 3 includes points with a modulo 3 result of 2. Retained data 5 may include the remaining points.

Generation of LoD Set

Figure 22:
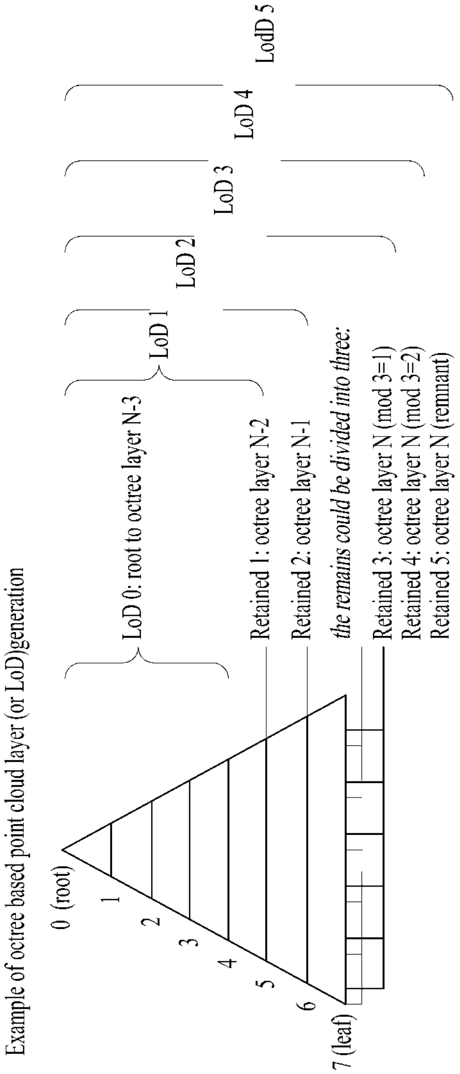
FIG. 22 illustrates LoD generation according to embodiments.

When a retained set is configured based on an octree structure, a higher LoD may include a lower LoD as in the LoD generation method FIG. 22 illustrates LoD generation according to embodiments.

The methods/devices according to the embodiments may generate LoDs as shown in FIG. 22. That is, the LoD at an n-th depth may include data in the LoD at leaf nodes and retain set data. The LoD at the n-th depth may also be represented using the LoD at an (n−1)-th depth and an n-th retained set.

In embodiments, the term "octree depth level" may be referred to in various ways, such as an octree depth layer, level, or layer.

The methods/devices according to the embodiments may create data sets based on the octree as described in FIG. 21 and generate LoDs from the data sets as shown in FIG. 22.

FIG. 22 illustrates an embodiment of octree-based LoD generation. In an octree structure with 7 levels except for the root level, LoD 0 may be generated from the root to octree depth level 4. Octree depth levels 5 and 6 may be configured as retained data 1 and 2, respectively. Thus, LoD 1 may be generated from the root to level 5, and LoD 2 may be generated from the root to level 6. For octree depth layer 7, it may be divided into three retained data sets. Point cloud data not selected in a previous LoD (LoD 2 in this embodiment) is sorted by Morton codes and divided by 3. Then, depending on the remainders, retained data 3, 4, and 5 may be generated. Thus, LoD 3 is LoD 2+retained 3, LoD 4 is LoD 2+retained 3+retained 4, and finally, LoD 5 may represent the entire data.

Fast Prediction Based on Octree Structure

When LoDs generated according to the embodiments are used for attribute coding based on prediction lifting transform, points included in a previous LoD (or points existing in the same LoD) may be used during a process of predicting points in a lower LoD as shown in FIG. 23.

FIG. 23 illustrates fast prediction according to embodiments.

The methods/devices according to the embodiments may generate octree-based data sets as shown in FIG. 21, create octree-based LoDs as shown in FIG. 22, and perform prediction-based attribute coding as shown in FIG. 23.

In a process of finding adjacent points during prediction, an algorithm for finding the nearest neighbor based on distance is significantly time-consuming. Typically, a method of finding neighbors among a certain range of points adjacent to points arranged in the increasing order of Morton code in the increasing order of LoD is used.

According to embodiments, LoDs may be configured based on an octree structure, and neighbors may be defined based on positional similarity (positional similarity between child nodes or lower nodes) that exists in the octree structure. In this case, if a method of finding neighbors based on higher nodes (parent nodes) in the octree structure is used in addition to constraints on the LoDs as shown in FIG. 24, neighbor search time may be effectively reduced.

FIG. 24 illustrates neighbor search based on an octree and LoDs according to embodiments.

According to embodiments, a transmitter and receiver may generate LoDs through the same process as shown in FIG. 24. The transmitter and receiver may perform prediction, transformation, and so on for attribute decoding based on LoDs to be used in the application field. Additionally, the transmitter and receiver may output the final output at an arbitrary LoD level.

For example, when attribute encoding and/or decoding are performed at octree depth level 6 corresponding to LoD 2 2400 based on octree-based LoDs according to the embodiments, neighboring points with attributes most similar to those of the current point may be efficiently found at LoD 2, LoD 1, and LoD 0.

FIG. 25 illustrates a bitstream including point cloud data according to embodiments.

The methods/devices according to the embodiments may generate a bitstream as shown in FIG. 25. The bitstream includes encoded geometry data and attribute data and may also include parameter information.

The syntax and semantics regarding the parameter information are defined as follows.

According to embodiments, information on separate slices may be defined in parameter sets of the bitstream and supplemental enhancement information (SEI) message as follows.

The bitstream may include an SPS, a GPS, an APS, a geometry slice header, and an attribute slice header. The bitstream may be defined at a corresponding or separate location depending on the application and system, allowing for variations in the application scope and application method. In other words, the bitstream may have different meanings depending on the location where the signal is delivered. If the bitstream is defined for the SPS, the bitstream may be applied equally to the entire sequence. If the bitstream is defined for the GPS, the bitstream may be used for location reconstruction. If the bitstream is defined for the APS, the bitstream may be applied to attribute restoration. If the bitstream is defined for the TPS, the bitstream may indicate that the signaling is applied only to points within a tile. If the bitstream is defined for a slice unit, the bitstream may indicate that the signaling is applied only to the corresponding slice. In summary, the bitstream may have different meanings depending on the location where the signal is delivered. If the syntax elements defined below are applicable not only to the current point cloud data stream but also to multiple point cloud data streams, the syntax elements may be transmitted by higher-level parameter sets.

Each abbreviation is defined as follows: SPS: Sequence Parameter Set, GPS: Geometry Parameter Set, APS: Attribute Parameter Set, TPS: Tile Parameter Set, Geom: Geometry bitstream=geometry slice header+geometry slice data, and Attr: Attribute bitstream=attribute slice header+attribute slice data.

According to embodiments, the information is defined independently of coding schemes, but the information may also be defined in conjunction with the coding schemes. To support regionally different scalability, the information may be defined in the TPS of the bitstream. If the syntax elements defined below are applicable not only to the current point cloud data stream but also to multiple point cloud data streams, the syntax elements may be transmitted by higher-level parameter sets.

Alternatively, if network abstract layer (NAL) units are defined for the bitstream and relevant information such as layer_id for selecting a layer is transmitted, the bitstream may be selected at the system level.

According to embodiments, parameters (which may be referred to by various terms such as metadata, signaling information, etc.) may be generated during the process of the transmitter according to the embodiments. The parameters may be transmitted to the receiver according to the embodiments for use in the reconstruction process.

For example, the parameters according to the embodiments may be generated by a metadata processor (or metadata generator) of a transmitting device 10000 according to embodiments, which will be described later, and acquired by a metadata parser of a receiving device according to embodiments.

The TPS may include information on tiles. For example, the TPS may carry information on the coordinates, width, depth, and depth of the bounding box for the tiles.

A slice may include information on geometry and/or attributes. For example, geometry may include geometry slice headers and geometry slice data. The slice may be referred to as a data unit. The geometry slice header may include the ID of a parameter set for the geometry, the ID of a tile to which the geometry slice belongs to, the ID of the slice, information on the location, node size, and number of geometry points of the bounding box including the geometry. The same applies to information on the attributes.

Hereinafter, the syntax and/or semantics of parameters included in a bitstream will be described.

FIG. 26 illustrates an APS according to embodiments.

Attribute Parameter Set ID (aps_attr_parameter_set_id): aps_attr_parameter_set_id indicates an attribute parameter set.

Sequence Parameter Set ID (aps_seq_parameter_set_id): aps_seq_parameter_set_id indicates a sequence parameter set related to the attribute parameter set.

Octree-Based Layering Flag (octree_based_layering_flag): When the octree_based_layering_flag is set to 1, it indicates that decoded PCC data is structured based on an octree and is in the form of layered data (e.g., matching with a LoD as in the embodiments). In this case, information on a relationship with octree depth levels used to represent layers in the application field may be provided.

Number of Layers (num_layers): num_layers represents the number of layers used in the application field. For example, num_layers may represent the number of LoDs. Depending on the application field, num_layers may be explicitly provided or inferred from given information as follows.

$$N = \sum_i n[i] \text{ where } n[i] = \begin{cases} 1 & \text{multiple layer present flag}[i] = 0 \\ \text{num sub layers}[i] & \text{multiple layer present flag}[i] = 1 \end{cases}$$

Number of Indices (num_index): num_index represents the number of layers that match octree depth levels matching layers used in the application field.

Octree Level Start (octree_level_start): octree_level_start) indicates a starting octree depth level used to construct an i-th layer (or i-th LoD).

Number of Octree Levels (num_octree_levels): num_octree_levels represents the number of octree depth levels used to construct an i-th layer (or i-th LoD). If num_octree_levels is 1, it indicates that point data matching a single octree depth level belongs to the i-th layer. If num_octree_levels is greater than 1, it may indicate that point data matching all num_octree_levels number of octree depth levels belongs to the i-th layer. In this case, it may be understood that octree depth layers from octree_level_start to octree_level_start+ num_octree_levels−1 belong to the i-th layer.

Multiple Layers Present Flag (multiple_layers_present_flag): When multiple_layers_present_flag is set to 1, it may indicate that multiple layers match a single octree depth level. When multiple_layers_present_flag is set to 0, it may indicate that one layer matches a single octree depth level.

Number of Sub-Layers (num_sub_layers): num_sub_layers represents the number of layers that match octree depth levels.

Division Type (division_type): division_type indicates a method of dividing octree depth levels into multiple layers. For example, division_type may be used to distinguish methods as shown in FIG. 27.

Number of Points (num_point): num_point represents the number of points that constitute each layer.

FIG. 27 illustrates division types according to embodiments.

The methods/devices according to the embodiments may divide octree depth levels into multiple layers as shown in FIG. 27.

1) A method of grouping point cloud data with the same modular result for the number of divisions (num_division[i]).

For example, as shown in FIG. 22, when a specific octree depth level is divided into three layers (data sets, LoDs, etc.), point cloud data with a remainder of 1 when dividing Morton code indices or values representing the point cloud data by 3 and point cloud data with a remainder of 2 when dividing Morton code indices or values representing the point cloud data by 3 may be set to layers together.

2) A method of dividing point cloud data into a certain quantity in a sequential manner.

For example, point cloud data included in an octree depth level may be divided by a certain number of layers and organized into layers. Multiple layers may be represented by the number of points (num_point).

Hereinafter, the components of the transmitter and receiver according to the embodiments will be described. Each component may correspond to a processor, software, or hardware, and so on. The following components may be combined with the structure of a PCC transmitter and receiver and/or signaling information.

FIG. 28 illustrates a point cloud data transmitting device according to embodiments.

The point cloud data transmitting device 10000 of FIG. 28 may perform a point cloud data transmission method according to embodiments and may be referred to as the transmitter and/or encoder according to the embodiments. The point cloud data transmitting device 10000 may be related to the transmitting device 10000, point cloud video encoder 10002, or transmitter 10003 of FIG. 1, the acquisition 20000/encoding 20001/transmission 20002 of FIG. 2, the encoder of FIG. 4, the transmitting device of FIG. 12, the device of FIG. 14, the encoding of FIGS. 15 to 16, the octree-based encoding of FIGS. 17 to 20, the LoD-based encoding of FIGS. 21 to 24, the bitstream and parameter generation of FIGS. 25 and 26, the division-based encoding of FIG. 27, the encoder of FIG. 28, the subgroup encoding of FIGS. 32 to 39, the parameter generation of FIG. 40, the scalable encoding of FIG. 41, the partial transmission of FIG. 43, and so on. Each component in FIG. 28 may correspond to a processor, hardware, software, and/or any combination thereof.

FIG. 28 shows an embodiment of a detailed functional configuration for encoding/transmitting PCC data. When point cloud data is input, an encoder may process position information (geometry data, for example, XYZ coordinates, phi-theta coordinates, etc.) and attribute information (attribute data, for example, color, reflectance, intensity, grayscale, opacity, medium, material, glossiness, etc.) separately.

In this case, a method of processing the attribute information may include: (1) matching the attributes and positions of point cloud data to octree nodes (point cloud data to octree matching); (2) generating a LoD based on an octree structure and the matched points (LoD generation); (3) estimating and removing similarities between the attribute information; (4) converting the estimated information into a format suitable for transmission or a domain with high compression efficiency and quantizing the information; and/or (5) performing entropy coding to transform the information into bit-level data suitable for transmission.

In this case, (1) an attribute estimation block (attribute prediction) may be performed based on the spatial distribution characteristics of neighboring data. Additionally, (2) a transformation block (transformation) may use various transformation techniques (e.g., DCT-based transform, lifting transform, RAHT, wavelet transform, etc.) depending on the type of data. Alternatively, the data may also be transmitted after quantization with no transformation.

An octree generator may receive geometry data for point cloud data and represent the positions in the geometry data in an octree structure. An octree including the point cloud data may be provided to an octree matching controller.

A geometry predictor may generate a predicted values for the geometry data to encode the geometry data based on the octree. The predicted values for the current point may be generated based on neighboring nodes (points). Specifically, the predicted values of the current geometry data is generated based on the closest neighbor to the current point, and a bitstream may be efficiently compressed by generating residual values between the current geometry data and the predicted values.

An entropy encoder may encode the point cloud data based on entropy methods. A geometry bitstream containing the compressed geometry data may be generated.

The octree matching controller may receive the attribute data and/or octree and match the point cloud data to the octree as described above.

A LoD generator may generate the LoD based on the octree (once the point cloud data is matched with the octree). The attribute data may also have a LoD.

An attribute predictor may generate predicted values of the attribute data for compressing the attribute data based on an octree-based LoD including the geometry data and attribute data. The attribute predictor may predict the most similar attribute data to the current attribute data from neighboring data based on the octree-based LoD. The attribute predictor may then generate residual values between the current attribute data and the predicted values to efficiently compress the bitstream. The attribute prediction may be performed for each LoD.

A transformer and quantizer may transform and quantize the attribute data. Transformation and/or quantization may be performed for each octree depth level.

The entropy encoder may encode the attribute data based on entropy coding. An attribute bitstream including the compressed attribute data may be generated.

Hereinafter, attribute coding available for compressing point cloud data based on the colorized octree structure according to the embodiments will be described in detail with reference to FIG. 29.

FIG. 29 illustrates attribute coding according to embodiments.

The devices/methods according to the embodiments such as FIG. 28 may encode attribute data as shown in FIG. 29.

An attribute encoding method according to embodiments may include: 1) detecting and predicting neighboring nodes; 2) generating prediction error information; 3) transforming attribute data; 4) selecting information; 5) transmitting bits; and/or 6) quantizing data.

1) Detecting and Predicting Neighboring Nodes

To detect the neighboring node, prediction may be performed based on the spatial proximity between child nodes within a certain range. For example, in an octree structure, it may be assumed that child nodes originating from the same parent node are adjacent to each other and that the prediction values between adjacent child nodes are similar. Therefore, in embodiments, it is defined that sibling nodes sharing the same parent node have the same prediction values, rather than computing separate prediction values for each child node. This may improve the coding efficiency by reducing the number of coefficients required when encoding each child node. Additionally, representative values may be applied to each parent node, allowing for the prediction of attributes corresponding to the octree structure.

FIG. 29 shows attribute prediction according to embodiments.

2900 in FIG. 29 shows a process of generating attribute prediction values P for nodes at LoD level 1 and LoD level 1-1 (parent-child) as described above. It is observed that predicted values P1 for child nodes are consistent with respect to the parent node.

In FIG. 29, p1(x, y, z) may be represented as p1(x, y, z)=c1-1(x/2, y/2, z/2).

2900 may be represented as 2903.

In FIG. 29, p1-1 is the parent node, and p1 is the child node. The sibling nodes, which correspond to the child node, may have the same attributes as the parent.

2) Generating Prediction Error Information

Based on prediction information, errors in prediction of the attributes of each child node may be determined as shown in 2901. The methods/devices according to the embodiments may use the difference between an original attribute value 29011 and a predicted attribute value 29012. Additionally, different approaches such as weighted difference or weighted averaged difference may be used depending on the implementation method or purpose.

Detecting and predicting the neighboring nodes and generating the prediction error information may be performed according to the prediction transform among the aforementioned attribute coding methods.

3) Transforming Attribute Data

Transforming the attribute data may be performed according to the lifting transform and/or RAHT transform among the aforementioned attribute coding methods.

4) Selecting Information

According to embodiments, it may be defined that lower-level nodes (in the direction of leaf nodes) have larger level values (n=N), while higher-level nodes (root node) have smaller level values (n=0) (in some cases, it may be reversed). In this case, the type of information transmitted varies for each level. For example, predicted attribute values may be transmitted at the highest level, while predicted errors may be transmitted at lower levels.

5) Transmitting Bits

The order of data transmission may be determined for each level by considering decoding. Data may be transmitted starting with predicted attribute values at the highest level and proceeding in an increasing order of levels. For each level, data may be transmitted in increasing order along the XYZ axes (e.g., the order of Morton code). If necessary, a reordering process may be added.

6) Quantizing Data.

Quantization shown in 2902 may be applied to predicted values and predicted errors. The level of quantization may be determined by a quantization factor q, and different quantization factors may be used depending on predicted values, predicted errors, or levels. The predicted values and predicted errors may be quantized based on quantization factors and rounding functions.

FIG. 30 illustrates a point cloud data receiving device according to embodiments.

The point cloud data receiving device of FIG. 30 may be related to the reception device 10004, receiver 10005, or point cloud video decoder 10006 of FIG. 1, the transmission 20002/decoding 20003/rendering 20004 of FIG. 2, the decoder of FIGS. 10 and 11, the reception device of FIG. 13, the device of FIG. 14, a decoder of FIG. 30, a scalable decoder of FIG. 41, and so on. Specifically, decoding of attribute data may be performed by the device illustrated in FIG. 30 based on the LoD shown in FIG. 15. Each component in FIG. 30 may correspond to a processor, hardware, software, processors, and/or any combination thereof.

FIG. 30 shows an embodiment of a detailed functional configuration for receiving/decoding PCC data. When bitstreams are input, a receiver may differentiate and process bitstreams for position information and attribute information. The bitstream for position information may undergo a process of regenerating an octree after entropy decoding. The attribute bitstream may go through (1) entropy decoding, (2) inverse quantization, (3) inverse transformation, (4) prediction of attribute information and reconstruction of attributes corresponding to octree nodes (colorized octree regeneration), and (5) collection of decoded octree-level point cloud data to output point cloud data (point cloud data aggregation). Then, attribute data may be output.

Herein, the terms position, positional information, and geometry data may be interchangeably used. The terms attribute, attribute information, and attribute data may be interchangeably used.

An entropy decoder may receive bitstreams. The bitstreams (FIG. 40) may include a geometry bitstream and an attribute bitstream. The entropy decoder may decode geometry data contained in the geometry bitstream based on entropy methods.

An octree regenerator may output the geometry data and generate the octree structure (octree) based on the geometry data. The octree represents a hierarchical inclusion relationship between parent and child nodes based on the positions of points in the geometry data.

The entropy decoder may receive bitstreams as described above. The entropy decoder may decode attribute data contained in the attribute bitstream based on entropy methods.

An inverse quantizer may inversely quantize the attribute data. That is, the inverse quantizer may inversely quantize data quantized by the transmitting end based on quantization coefficients. The inverse quantizer may generate inversely quantized residual values (prediction errors) and/or predicted attributes.

An inverse transformer may inversely transform the attribute data. That is, the inverse transformer may inversely transform attribute data transformed by the transmitting end. The inverse transformer may generate inversely transformed residual values (prediction errors) and/or predicted attributes.

A predictor and regenerator may receive a geometry-based octree. The predictor (regenerator) may match the attribute data with the geometry-based octree. The geometry-attribute-based octree may be referred to as a colorized octree. The attribute data (color) may be matched with the nodes of the octree. The predictor (regenerator) may receive depth levels for representation and represent the colorized octree based on the depth levels.

A LoD-based scalable representor may represent the attribute data in a scalable manner based on the colorized octree and depth levels. Scalable LoD-based attribute data may be generated.

Hereinafter, additional operations of the point cloud data receiving device according to the embodiments will be described.

(1) Detection of Neighboring Nodes

The receiver may detect neighboring nodes based on an octree structure for reconstructing position information in the same way as the transmitter. The neighboring nodes may be defined as sibling nodes sharing the same parent. If the neighboring nodes have a different definition (e.g., different sizes), information required for the receiver to detect the neighboring nodes may be transmitted. Specifically, the transmitting device may include and transmit additional information necessary for the receiving device in a bitstream.

(2) Prediction of Attribute Based on Information on Neighboring Node

The receiver predicts attributes in the reverse order of attribute prediction performed by the transmitter, progressing down the levels (from the root node to the leaves) (that is, the receiver generates prediction data for the current attribute data). The prediction follows the same method as used by the transmitter. The reconstructed attributes of a parent node may be used as the prediction values for child nodes. If the use of multiple methods is allowed, the methods used during encoding and additional information may be transmitted. FIG. 31 shows an attribute prediction process.

FIG. 31 illustrates attribute prediction and attribute reconstruction according to embodiments.

As shown in 3100 of FIG. 31, the methods/devices according to the embodiments may use the reconstructed attributes of a parent node as the prediction data for child nodes of the parent node.

According to embodiments, 3100 may be represented as 3102, for example.

(3) Reconstruction of Attributes

The receiver inversely performs the prediction error generation method used by the transmitter to reconstruct the attributes of each child node based on information on predicted attributes. For example, if the receiver generates prediction errors based on the difference between the original attributes and predicted attributes, the receiver may reconstruct attribute information by adding estimated predicted attributes and decoded prediction errors as shown in 3101 of FIG. 31. If the receiver is capable of using various error generation methods, information on a method the receiver needs to use may be provided. The transmitter may include and transmit the information required for the receiver in a bitstream.

(4) Output of Information

Typically, the receiver outputs the attributes of leaf nodes as the final result. However, the receiver may output results at a certain level depending on the receiver performance, the application field, the presence of information, etc. In this case, the level to be output and related information may be provided.

The methods/devices according to the embodiments may perform scalable attribute coding by considering a layer group structure.

The point cloud data transmitting device, octree matching controller, and LoD Generator of FIG. 28, the point cloud data receiving device, predictor (reconstructor), and LoD-based scalable representor of FIG. 30, and so on may generate an octree according to the embodiments and compress and reconstruct point cloud data by matching LoD information. Additionally, considering the layer group structure, the devices may further generate an octree and compress and reconstruct point cloud data by matching LoD information. The point cloud data may be compressed and reconstructed in a scalable manner.

Figure 32:
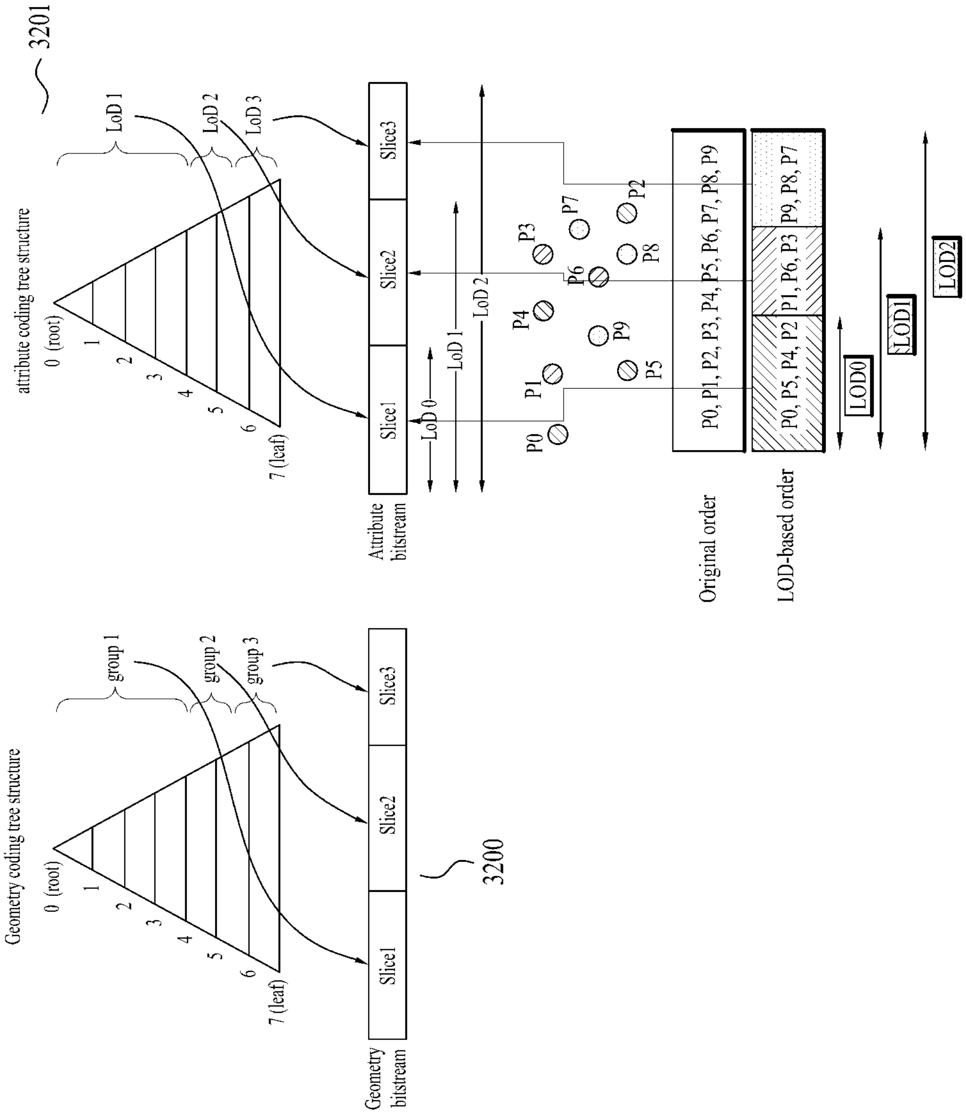
FIG. 32 illustrates a bitstream structure including an octree including geometry data and attribute data according to embodiments.

Referring to FIG. 32, 3200 represents a geometry layer group structure based on an octree structure. Each layer group constitutes an independent slice, thereby supporting scalable transmission, progressive decoding, and spatial random access.

Layer group 1: Octree depths 0 to 3

Layer group 2: Octree depths 4 to 5

Layer group 3: Octree depths 6 and 7

The methods/devices according to the embodiments may represent the octree structure with multiple layer groups as follows. Layer group 1 may include octree depths (depth levels) 0 to 3. Layer group 2 may include octree depths 4 to 5. Layer group 3 may include octree depths 6 and 7.

Based on the geometry layer group structure, a LoD structure used for attribute compression may be created. 3201 represents the generation of an attribute compression structure based on the layer group structure, where each slice may correspond to each LoD. In this case, subsequent slices may be configured to include information on nodes that do not overlap with those of preceding slices.

LoD 1: layer group 1

LoD 2: layer group 2

LoD 3: layer group 3

For example, LoD 1 may correspond to layer group 1, LoD may correspond to layer group 2, and LoD 3 may correspond to layer group 3.

FIG. 32 illustrates a bitstream structure including an octree including geometry data and attribute data according to embodiments.

The devices of FIG. 28 and FIG. 30 may generate and parse a bitstream with the same structure as shown in FIG. 32.

The devices in association with those of FIG. 28 and FIG. 30 may use an octree-layer group-LoD-slice-bitstream relationship as shown in FIG. 32 to compress and reconstruct point cloud data.

Figure 33:
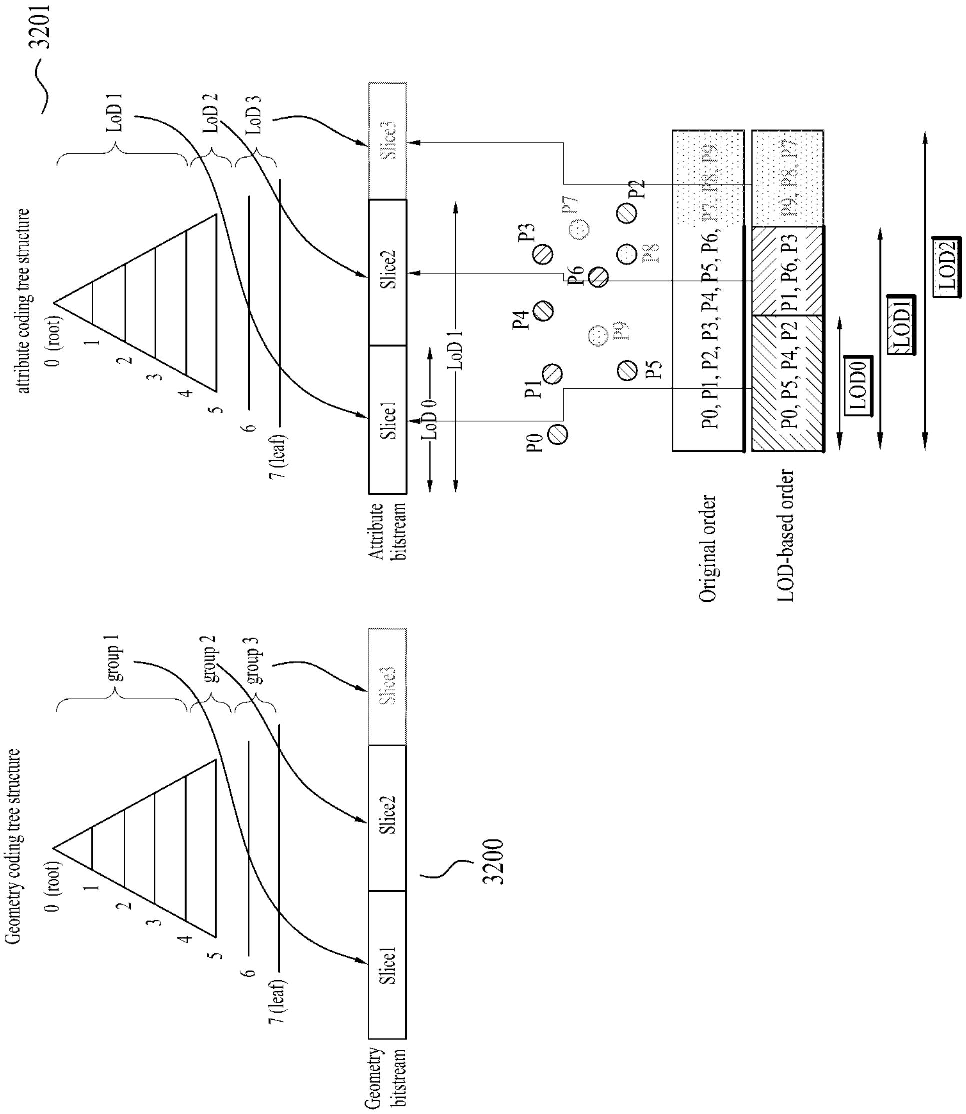
FIG. 33 illustrates a bitstream structure including an octree including geometry data and attribute data according to embodiments.

For a geometry/attribute bitstream including slices based on the layer group structure, the receiver may selectively use the slices depending on performance, use cases, etc. FIG. 33 shows an example in which slice 3 is not used for geometry/attributes (geom/attr). In this case, partial decoding or scalable decoding may be performed for octree depths by outputting information on octree depth 5 and/or LoD 2. In addition, since a LoD is configured to correspond to a geometry octree structure, attributes may be one-to-one matched to output nodes.

Based on a geometry coding tree structure, a point cloud data transmission method/device and/or geometry encoder according to the embodiments may generate a geometry bitstream as shown in FIG. 32. The geometry bitstream may carry geometry data encoded based on slices. The geometry data may be represented with multiple tree depths (levels, layers, etc.) based on the hierarchical tree structure. One or more tree depths (levels, layers, etc.) may be designated as a group. For example, group 1 may include depths 0 to 3 of the geometry data, group 2 may include depths 4 and 5 of the geometry data, and group 3 may include depths 6 and 7 (leaf nodes) of the geometry data. One group may be included in one slice of the bitstream.

Based on an attribute coding tree structure, a point cloud data transmission method/device and/or attribute encoder according to embodiments may generate an attribute bitstream as shown in FIG. 32. The attribute bitstream may carry attribute data encoded based on slices. The attribute data may be represented with multiple tree depths (levels, layers, etc.) based on the hierarchical tree structure. One or more tree depths (levels, layers, etc.) may be designated as a LoD. For example, LoD 1 may include depths 0 to 3 of the attribute data, LoD 2 may include depths 4 and 5 of the attribute data, and LoD 3 may include depths 6 and 7 (leaf nodes) of the attribute data. One attribute may be included in one slice of the bitstream. Slice 1 may convey LoD 1, Slice 2 may convey LoD 2, and Slice 3 may convey LoD 3.

FIG. 33 illustrates a bitstream structure including an octree including geometry data and attribute data according to embodiments.

The transmission method/device according to the embodiments may encode and transmit point cloud data as shown in FIG. 32, while the receiving method/device in association with the transmission method/device may decode the point cloud data based on a hierarchical layer structure as shown in FIG. 33.

For example, the point cloud data receiving method/device and/or geometry decoder according to the embodiments may receive a geometry bitstream containing a geometry coding layer structure as shown in FIG. 33. The geometry bitstream may include two or three slices. The receiving method/device according to the embodiments may decode only two slices among three slices or receive only two slices. In other words, multiple slices may be received partially. Alternatively, while all slices are received, some of the slices may be partially decoded. To this end, the geometry coding layer structure may include a layer structure that encompasses all nodes from the root node to the leaf nodes or include some groups for partial decoding. Alternatively, some groups may be partially decoded. In the geometry coding layer structure shown in FIG. 33, layer depths from layer depth 0 (root node) to layer depth 5 are included or decoded. In this case, group 1 may be transmitted by slice 1, and group 2 may be transmitted by slice 2.

For example, the point cloud data receiving method/device and/or geometry decoder according to the embodiments may receive an attribute bitstream containing an attribute coding tree structure as shown in FIG. 33. The attribute bitstream may include two or three slices. The receiving method/device according to the embodiments may decode only two slices among three slices or receive only two slices. In other words, multiple slices may be received partially. Alternatively, while all slices are received, some of the slices may be partially decoded. To this end, the attribute coding tree structure may include a tree structure that encompasses all nodes from the root node to the leaf nodes or include some LoDs for partial decoding. Alternatively, some LoDs may be partially decoded. In the attribute coding tree structure shown in FIG. 33, tree depths from tree depth 0 (root node) to tree depth 5 are included or decoded. In this case, LoD 1 may be transmitted by slice 1, and LoD 2 may be transmitted by slice 2.

Figure 34:
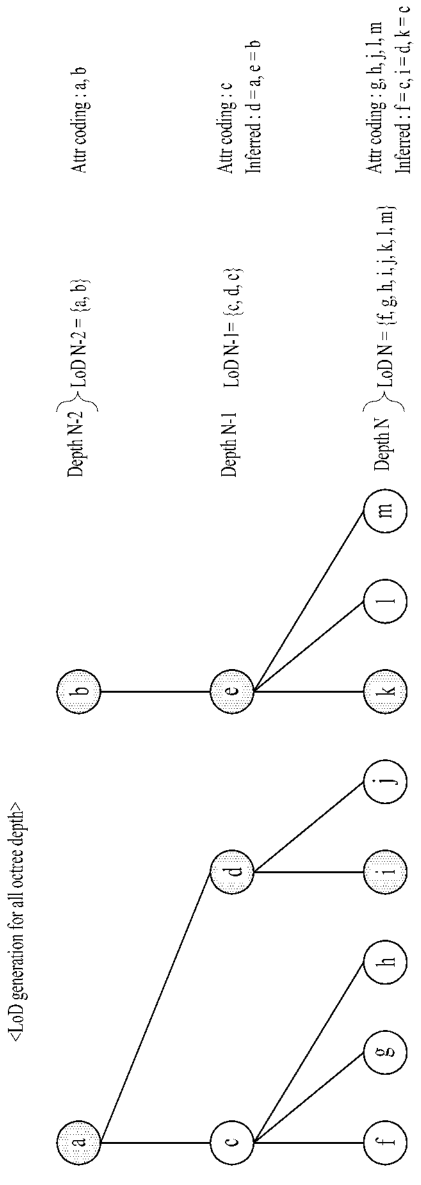
FIG. 34 illustrates LoD generation according to embodiments.

FIG. 34 illustrates LoD generation according to embodiments.

The transmission/reception methods/devices according to the embodiments may generate LoDs and encode and decode point cloud data based on the LoDs as shown in FIG. 34.

FIG. 34 illustrates a LoD generation method for supporting scalability. Among the attributes of nodes belonging to depth N, the methods/devices according to the embodiments may assign attribute data to depth N−1 based on a parent-child relationship. In other words, for node c, the attributes of child node f among child nodes f, g, or h may be selected. Recursively, the attributes of a child node may be selected for depth N−2.

$$LoD\ N-2:\ a(=d),\ b(=e)$$

$$LoD\ N-1:\ c(=f),\ d(=i),\ e(k)$$

$$LoD\ N:\ f,\ g,\ h,\ i,\ j,\ k,\ l,\ m$$

For example, if each of nodes f to m in LoD N (depth, layer, etc.) has its own attribute data (e.g., color value), the attribute data at a higher level (depth, layer, etc.) may be selected from among the attributes of child nodes. This may be referred to as octree-based LoD attribute subsampling. Based on a subsampled attribute data structure, the point cloud data may be encoded and decoded in a scalable manner. The attributes of node f, which has the most similarity to the parent node among child nodes f to h, may be selected and set as the attributes of node c. If it is expected that among child nodes c and d of node a, node d has the most similar attributes to node a, the attributes of node d may be set as the attributes of node a. Parent-child node relationships with the same attributes may be created in ascending order from lower depth to higher depth, and scalable coding may be allowed based on these relationships.

Attribute encoding may start from depth N−2 (LoD N−2), and then attribute data for nodes a, b, c, g, h, j, l, and m may be encoded. Since the attributes of sub-sampled nodes may be estimated (predicted), only new attribute data may be encoded. For example, node d has the same attributes as node a, node e has the same attributes as node b, node f has the same attributes as node c, node i has the same attributes as node d, and node k has the same attributes as node e.

In this case, each octree depth may be one-to-one matched with a LoD. When attribute encoding is performed, redundancy may be reduced by compressing only attributes that do not overlap with higher LoDs.

LoD N−2: nodes undergoing attribute compression: a (=d), b (=e)

LoD N−1: nodes undergoing attribute compression: c (=f)

LoD N: nodes undergoing attribute compression: g, h, j, l, m

In the LoD generation process, the receiver reconstructs the compressed attributes but estimates the attributes sampled into a higher LoD based on the attributes of the parent. LoD N−2: nodes undergoing attribute decoding: a, b LoD N−1: nodes undergoing attribute decoding: c Nodes inferred by parent: d=a, e=b LoD N: nodes undergoing attribute decoding: g, h, j, l, m Nodes inferred by parent: f=c, i=d, k=e FIG. 35 illustrates LoD generation for a layer group structure according to embodiments.

Figure 35:
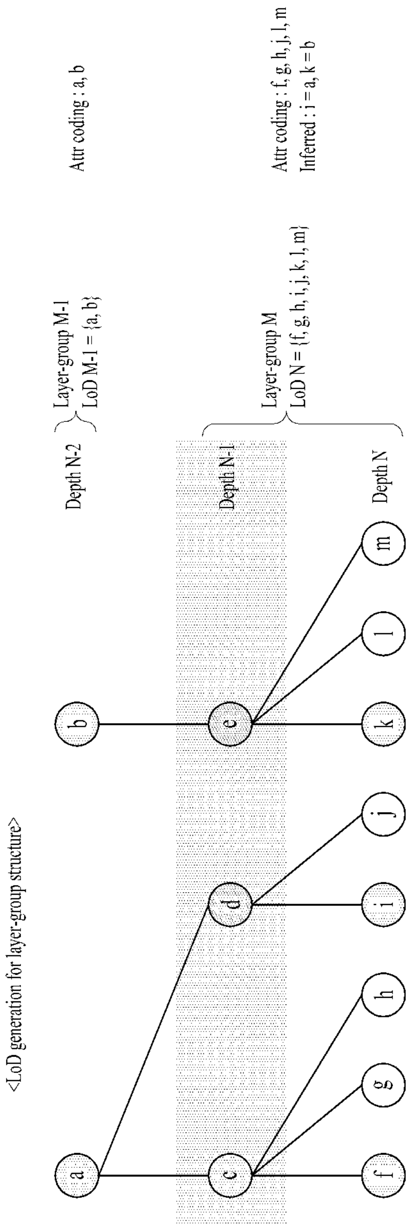
FIG. 35 illustrates LoD generation for a layer group structure according to embodiments.

The methods/devices according to the embodiments may generate LoDs based on the layer group structure as shown in FIG. 35.

A depth corresponding to an octree depth closest to leaf nodes among octree depths belonging to each layer group may be matched to a LoD. In FIG. 35, LoD M−1 may be matched with depth N−1, and LoD M may be matched with depth N. The LoD generation may perform sampling based on an ancestor-descendant node relationship by extending the parent-child relationship. Accordingly, nodes a and b may be included in LoD M−1, and nodes f, g, h, i, j, k, l, and m may be included in LoD M. According to the LoD generation, the attributes of nodes a and b may be used by descendant nodes i and k.

For example, if layer group M includes depth N and depth N−1, LoD M may include a depth closer to the leaf nodes, which is depth N. In other words, LoD M may include nodes f, g, h, i, j, k, l, and m. If layer group M−1 includes depth N−2, LoD M−1 may include a depth closer to the leaf nodes, which is depth N−2. In other words, LoD M−1 may include nodes a and b.

$$LoD\ M{-}1:\ a(=i),\ b(=k)$$

$$LoD\ M:\ f,\ g,\ h,\ i,\ j,\ k,\ l,\ m$$

In attribute compression, the attributes of nodes that do not overlap with a previous LoD are compressed. However, in the case of nodes i and k in FIG. 35, the attributes thereof are not compressed because the attributes of LoD M−1 are used (the nodes where LoD sampling is performed are color-processed based on the ancestor-descendant relationship)

LoD M−1: nodes undergoing attribute compression: a (=i), b (=k)

LoD M: nodes undergoing attribute compression: f, g, h, j, l, m

The receiver may restore the attributes by performing decoding for each LoD and infer nodes with the ancestor-descendant relationship LoD M−1: nodes undergoing attribute decoding: a, b LoD M: nodes undergoing attribute decoding: f, g, h, j, l, m Nodes inferred by parent: i=a, k=b In other words, the methods/devices according to the embodiments may perform attribute encoding for nodes a and b with depth N−2, LoD M−1, and layer group M=1. The methods/devices according to the embodiments may perform attribute encoding for nodes f, g, h, j, l, and m with depth N, layer group M, and LoD M. The methods/devices according to the embodiments may skip depth N−1 belonging to layer group M and rapidly process depth N at LoD M. Furthermore, since the nodes i and k are capable of being inferred from the attributes of ancestor nodes, nodes a and b, it is possible to reduce delays.

As the LoD depth and tree depth increase, the encoder/decoder may skip a certain depth, allowing for faster encoding/decoding of nodes.

Figure 36:
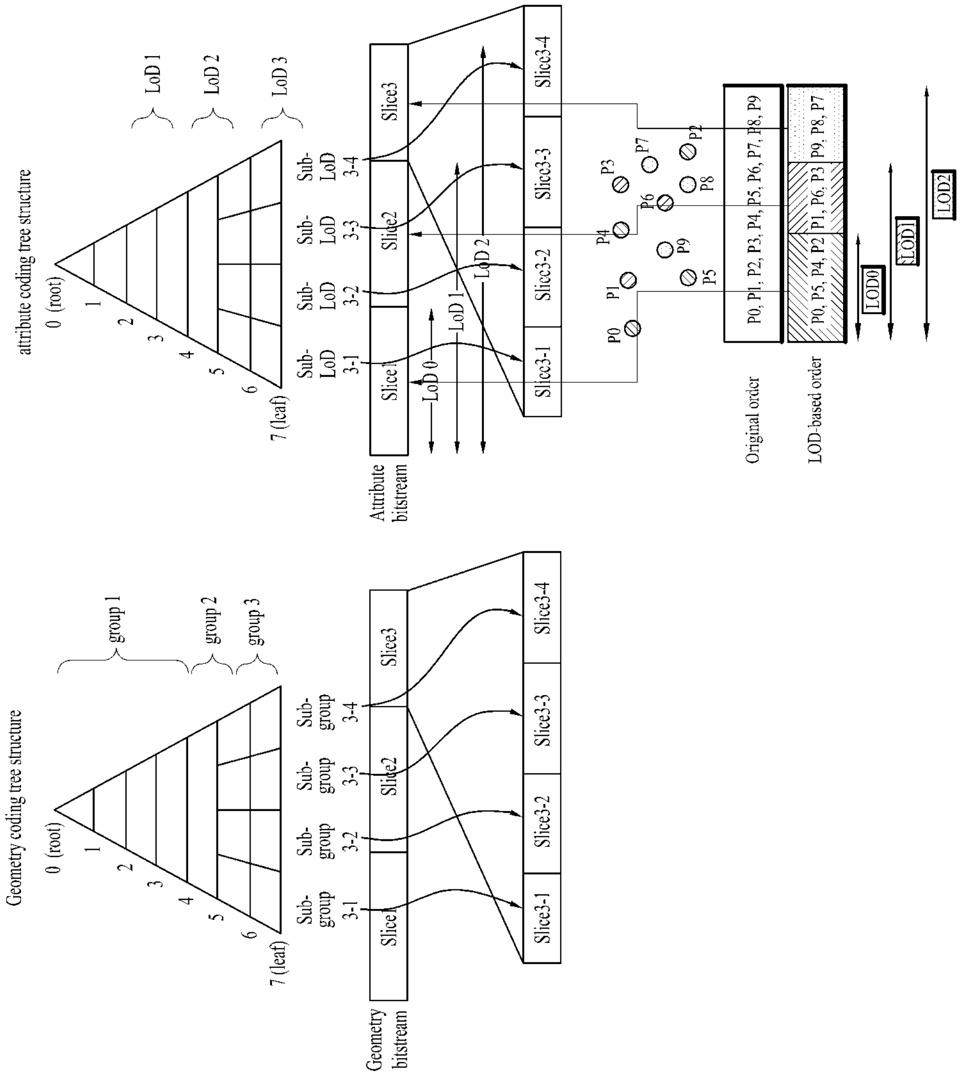
FIG. 36 illustrates spatial random access based on layer groups and subgroups according to embodiments.

FIG. 36 illustrates spatial random access based on layer groups and subgroups according to embodiments.

The methods/devices according to the embodiments may support spatial random access by dividing each layer group into multiple subgroups as shown in FIG. 36. FIG. 36 shows an example of dividing each of three layer groups into four subgroups. For attributes, it is also possible to create a LoD structure that corresponds one-to-one with a geometry layer group structure. Each subgroup may be provided to an independent slice.

LoD 1=layer group 1

LoD 2=layer group 2

LoD 3=layer group 3 subgroup 3-1=subgroup 3-1 subgroup 3-2=subgroup 3-2 subgroup 3-3=subgroup 3-3 subgroup 3-4=subgroup 3-4

The geometry encoder according to the embodiments may classify geometry data into groups including tree depth(s). Then, the geometry encoder may divide each group into subgroup(s) and include each subgroup in a sub-slice.

The attribute encoder according to embodiments may classify attribute data into LoDs including tree depth(s). Then, the attribute encoder may include each LoD in a slice.

Alternatively, the attribute encoder may divide the LoD into sub-LoD(s) and include each sub-LoD in a sub-slice.

Figure 37:
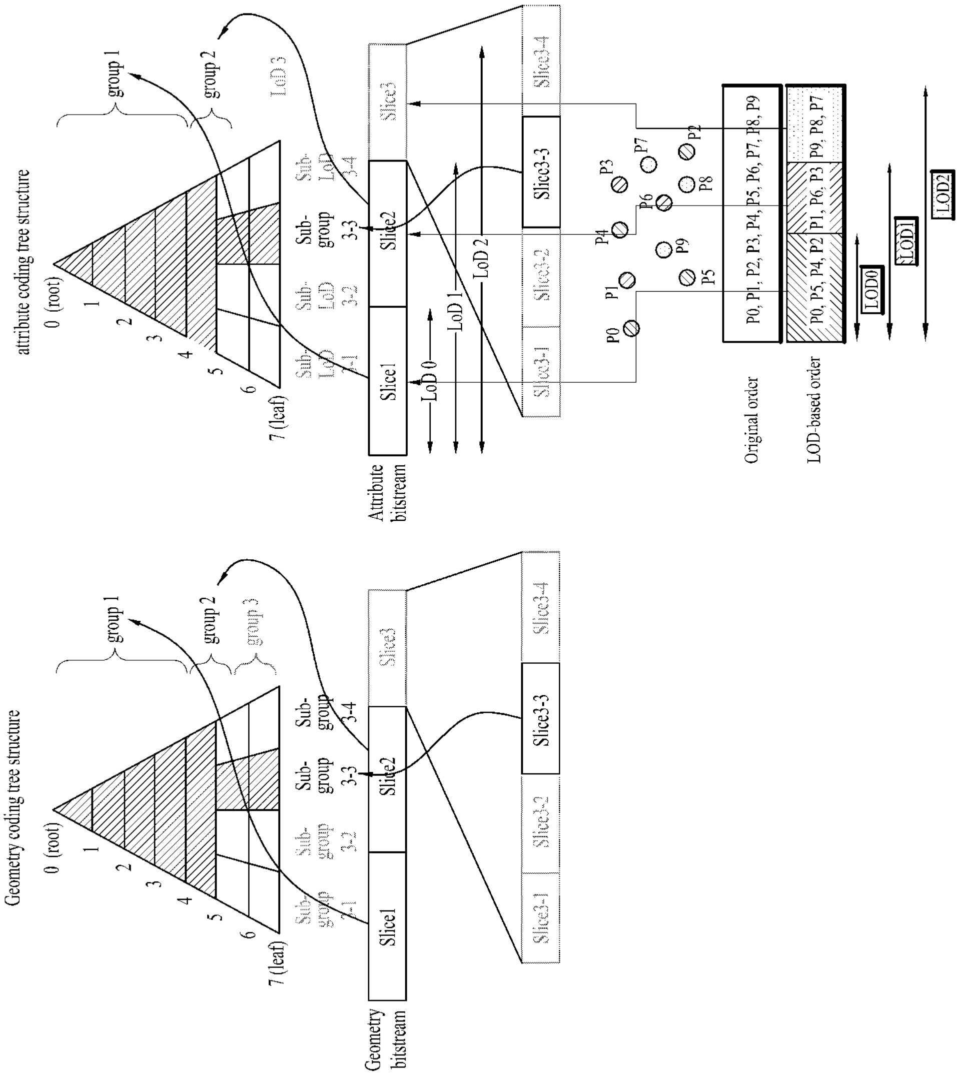
FIG. 37 illustrates adaptive representation of point cloud data according to embodiments.

FIG. 37 illustrates adaptive representation of point cloud data according to embodiments.

The methods/devices according to the embodiments may provide point cloud data in various ways, ranging from high resolution to low resolution, as shown in FIG. 37.

The receiver may provide high-density point cloud data for a region of interest (ROI) by selecting a required subgroup. FIG. 37 shows an example in which subgroup 3-3 is selected. A slice related to a subgroup that overlaps the ROI space required by the receiver may be selected. To this end, a slice may carry transmit information on the areas of each layer group and subgroup in the form of a bounding box. For attributes, the attributes of a decoded node may be restored by selecting a sub-LoD corresponding to the selected subgroup. In addition, depending on the application field, the receiver may generate output by adjusting the density adaptively such as a low-density (low-resolution) point distribution for the entire area and a high-density (high-resolution) point distribution for the selected area.

As shown in FIG. 37, the hierarchical structure of geometry may be created with layers, groups, and subgroups, while the hierarchical structure of attributes may be created with trees, layers, LoDs, and sub-LoDs. The hierarchical structure may include an octree but may also include various tree structures including 8 child node dependencies.

As shown in FIG. 37, the transmitting method/device according to the embodiments may transmit slice bitstreams based on the tree (layer) structure, and the receiving method/device may partially decode some slices (groups, subgroups, LoDs, sub-LoDs, etc.).

As shown in FIG. 37, the transmitting method/device according to the embodiments may partially transmit slice bitstreams based on the tree (layer) structure, and the receiving method/device may fully or partially decode received slices (groups, subgroups, LoDs, sub-LoDs, etc.).

FIG. 38 illustrates sub-LoD search according to embodiments.

As shown in FIG. 37, when subgroups are compressed, nearest neighbor search (NN search) may be performed based on subgroup boundaries. The NN search serves to ensure independent decoding of each subgroup. A sub-LoD may be defined to satisfy the following conditions:

1) A set of nodes located at adjacent positions; and
2) Children/descendants related to the same parent/ancestor are defined to belong to the same sub-LoD.

In other words, the sub-LoD may be defined by the range of included nodes. When the nearest neighbors of nodes belonging to each LoD are searched for, if the current LoD has a sub-LoD, spatial information on each node belonging to the sub-LoD may be represented by a bounding box. In other words, the sub-LoD may be defined by a set of nodes that are adjacent in position, and the sub-LoD related to each node may be found based on whether each node falls within a specific range of positions (from bbox_min to bbox_max).

The methods/devices according to the embodiments including the geometry encoder, attribute encoder, geometry decoder, and attribute decoder may include or perform the following steps: 1) searching for a sub-LoD bounding box (boundary); and 2) updating nearest neighbors.

1) Searching for Sub-LoD Bounding Box (Boundary)

A nearest neighbor calculator (Computenearestneighbour) included in the encoder and decoder is responsible for finding adjacent nodes for nodes belonging to each LoD. For LoDs divided into subgroups, the sub-LoD to which each node belongs may be found by comparing the sub-LoD bounding box and the position of each node as shown in FIG. 38.

```
Vec3<int> nodePos = pointCloud[pointIndex]; // 1. For the position of the current node
if (!(nodePos.x( ) >= bbox_min.x( ) && nodePos.x( ) < bbox_max.x( )
&& nodePos.y( ) >= bbox_min.y( ) && nodePos.y( ) < bbox_max.y( )
&& nodePos.z( ) >= bbox_min.z( ) && nodePos.z( ) < bbox_max.z( ))) {
// 2. If the node does not belong to the bounding box of the current sub-LoD, a sub-LoD
including the node is searched for.
for (int i = 0; i <= abh.num_sub_groups_minus1[curLayerGroupId]; i++) {
Vec3<int> bbox_min_tmp = abh.vec_bboxOrigin[curLayerGroupId][i];
Vec3<int> bbox_max_tmp = bbox_min_tmp + abh.vec_bboxSize[curLayerGroupId][i];
if (nodePos.x( ) >= bbox_min_tmp.x( ) && nodePos.x( ) < bbox_max_tmp.x( )
&& nodePos.y( ) >= bbox_min_tmp.y( ) && nodePos.y( ) < bbox_max_tmp.y( )
&& nodePos.z( ) >= bbox_min_tmp.z( ) && nodePos.z( ) < bbox_max_tmp.z( )) {
curSubgroupId = i;
bbox_min = bbox_min_tmp;
bbox_max = bbox_max_tmp;
break;
// 3. If the node belongs to the bounding box of the current sub-LoD, the range of a
bounding box including the node is configured.
}
```

FIG. 39 illustrates a method for updating nearest neighbors according to embodiments.

After finding the sub-LoD bounding box as described above, 2. Nearest Neighbor Update may be performed.

Based on information on the bounding box of the sub-LoD, the nearest neighbor search algorithm may select a predictor for neighboring nodes when the corresponding nodes belong to the same sub-LoD. When neighboring nodes belong to different sub-LoDs, the algorithm may select no predictor candidates as shown in FIG. 39.

```
if (!(nodePos.x( ) >= bbox_min.x( ) && nodePos.x( ) < bbox_max.x( )
&& nodePos.y( ) >= bbox_min.y( ) && nodePos.y( ) < bbox_max.y( )
&& nodePos.z( ) >= bbox_min.z( ) && nodePos.z( ) < bbox_max.z( ))) {
return; // Determine whether the current node belongs to the bounding box. If the current
node does not belong to the bounding box, the current node may not be set as the predictor, so do
not update the nearest neighbor.
}
}
......
insertNeighbour(
pointIndex1, norm1, aps.num_pred_nearest_neighbours_minus1, neighborCount,
neighbors); // If the current node belongs to the sub-LoD bounding box, the current node
may be set as the predictor.
```

The NN search based on the sub-LoD may be performed identically in the encoder and decoder.

FIG. 40 illustrates an attribute data unit header according to embodiments.

The attribute data unit header is included in the bitstream of FIG. 25 and may correspond to the attribute slice header of FIG. 25.

Layer Group Enabled Flag (layer_group_enabled_flag): When layer_group_enabled_flag is 1, it indicates that the attribute bitstream of a frame or tile is included in multiple slices that match a LoD layer or sub-LoD. When layer_group_enabled_flag is 0, it indicates that the attribute bitstream of a frame or tile is included in a single slice.

Number of Layer Groups (num_layer_groups_minus1): The sum of num_layer_groups_minus1 plus 1 represents the number of layer groups, each of which represents a group of consecutive tree layers that are part of an attribute coding tree structure, where num_layer_groups_minus1 may range from 0 to the number of coding tree layers.

Layer Group ID (layer_group_id): layer_group_id is an indicator representing a layer group for a frame or tile. The range of layer_group_id may be between 0 and num_layer_groups_minus1.

Dependent Slice Flag (dependent_slice_flag): If dependent_slice_flag is set to 1, it indicates that slices are dependent on a slice indicated by ref_slice_id and ref_layer_group_id. If dependent_slice_flag is set to 0, it indicates that slices are not dependent on other slices and may start decoding of the corresponding slices.

Reference Slice ID (ref_slice_id): ref_slice_id is an indicator representing a reference slice. The range of ref_slice_id may be within the range of slice_id used in the current frame or current tile.

Reference Layer Group ID (ref_layer_group_id): ref_layer_group_id is an indicator representing a reference layer group. The range of ref_layer_group_id may be within the range of 0 to num_layer_group_minus1 in the current frame or current tile.

Number of Layers (num_layers_minus1): The sum of num_layers_minus1 plus 1 represents the number of coding layers included in an i-th layer group. The total number of layer groups may be derived by adding all (num_layers_minus1[i]+1) for the same i, where i ranges from 0 to num_layer_groups_minus1.

Layer Group Stream Length Bits (layer_group_stream_len_bits): The sum of layer_group_stream_len_bits plus 1 represents the bit length of a syntax element layer_group_stream_len.

Layer Group Stream Length (layer_group_stream_len): layer_group_stream_len indicates the length of the current layer group stream (layer_group_stream).

Subgroup Enabled Flag (subgroup_enabled_flag): If subgroup_enabled_flag is set to 1, it indicates that the current layer group consists of subgroups capable of being included in multiple slices. If subgroup_enabled_flag is set to 0, it indicates that the current layer group is included in a single slice. Subgroups are mutually exclusive, and the sum of subgroups is equivalent to the layer group.

Number of Subgroups (num_subgroups_minus1): The sum of num_subgroups_minus1 plus 1 represents the number of subgroups within a layer group indicated by layer_group_id.

Subgroup ID (subgroup_id): subgroup_id is an indicator representing a subgroup within a layer group indicated by layer_group_id. The range of subgroup_id may be between 0 and num_subgroups_minus1 [layer_group_id]. Here, subgroup_id may denote the order of slices within the same value of layer_group_id. If there is no subgroup_id, subgroup_id may be inferred as 0.

Reference Subgroup ID (ref_subgroup_id): ref_subgroup_id is an indicator representing a reference subgroup within a layer group indicated by ref_layer_group_id. The range of ref_subgroup_id may be within the range of 0 to num_subgroup_id_minus1 in the current layer group. If there is no ref_subgroup_id, ref_subgroup_id may be inferred as 0.

Number of Points Bits (num_points_bits_minus1): The sum of num_points_bits_minus1 plus 1 represents the bit length of a syntax element num_points.

Number of Points (num_points): num_points represents the number of points output by decoding the current slice.

Subgroup Bounding Box Origin Bits (subgroup_bbox_origin_bits_minus1): The sum of subgroup_bbox_origin_bits_minus1 plus 1 represents the bit length of a syntax element subgroup_bbox_origin.

Subgroup Bounding Box Origin (subgroup_bbox_origin): subgroup_bbox_origin represents the origin of the bounding box of a subgroup indicated by subgroup_id within a layer group indicated by layer_group_id.

Subgroup Bounding Box Size Bits (subgroup_bbox_size_bits_minus1): The sum of subgroup_bbox_size_bits_minus1 plus 1 represents the bit length of a syntax element subgroup_bbox_size.

Subgroup Bounding Box Size (subgroup_bbox_size): subgroup_bbox_size represents the size of the bounding box of a subgroup indicated by the subgroup_id within a layer group indicated by layer_group_id.

FIG. 41 illustrates a point cloud data encoder/decoder according to embodiments.

The point cloud data encoder/decoder of FIG. 41 may be related to the transmitting device 10000, point cloud video encoder 10002, or transmitter 10003 of FIG. 1, the acquisition 20000/encoding 20001/transmission 20002 of FIG. 2, the encoder of FIG. 4, the transmitting device of FIG. 12, the device of FIG. 14, the process in which the encoder of FIG. 28 generates a LoD for attribute data based on the octree of geometry data, the reception device 10004, receiver 10005, or point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 30, etc.

LoD generation according to embodiments has the effect of compressing/restoring prediction and lifting transform attributes with low computational loads.

According to embodiments, receivers with various performance levels may be provided. The receivers may perform point cloud compression based on the structure of point cloud data (see FIGS. 15 to 37) and support a single compressed bitstream based on the compression method. For example, when information is compressed for decoders with different performance, it is possible to support receivers with various performance levels through a single bitstream, instead of generating or storing independent compression information suitable for the performance of the decoders. This may provide advantages in terms of the storage space and bit efficiency at the transmitter. Additionally, when there are limitations on the transmission bandwidth, the transmitter may generate and transmit low-resolution point cloud data.

According to embodiments, when receiving point cloud data, the receiver may perform geometry decoding with minimal computational loads and simultaneously restore attribute information. Thus, the receiver may be used in low-delay transmission systems.

By selecting the output level of attribute information, a receiver with low computational power may output the attribute information suitable for the performance of the receiver without delay. For example, based on attribute decoding and reconstruction, the receiver may output different results depending on the performance or system requirements thereof. In this case, the attributes of each decoded or reconstructed level may be used as attribute values matched with an octree node at the corresponding level. When a colorized octree is transmitted according to the characteristics of point cloud coding, an octree level may be selected based on the output or rendering performance. After decoding in consideration of the output or rendering performance, the receiver may perform octree colorization on restored point cloud data and then output or render a low-resolution image.

Referring to FIG. 41, the point cloud data transmitting device 10000 or encoder (referred to as the geometry encoder, attribute encoder, scalable encoder, etc.) according to the embodiments may compress (encode) source geometry and source attributes in a scalable manner as described above. The point cloud data transmitting device 10000 may generate and transmit a single PCC bitstream. A bitstream selector may selectively transmit a bitstream to the decoder in conjunction with the encoder. For example, considering the performance of the scalable decoder, it is possible to decode various bitstream configurations. A bitstream including partial geometry and partial attributes may be transmitted. In addition, a bitstream including full geometry and partial attributes may be decoded, and a bitstream including full geometry and full attributes may also be decoded. Storage capable of storing a bitstream may store the encoded bitstream and transmit part/all of the bitstream to the decoder. A single bitstream generated based on the hierarchical structure (referred to as the layer structure, group structure, LoD structure, etc.) according to the embodiments may be transmitted at once. The decoder may scalably decode all and/or part of the point cloud data suitable for the receiver performance.

Figure 42:
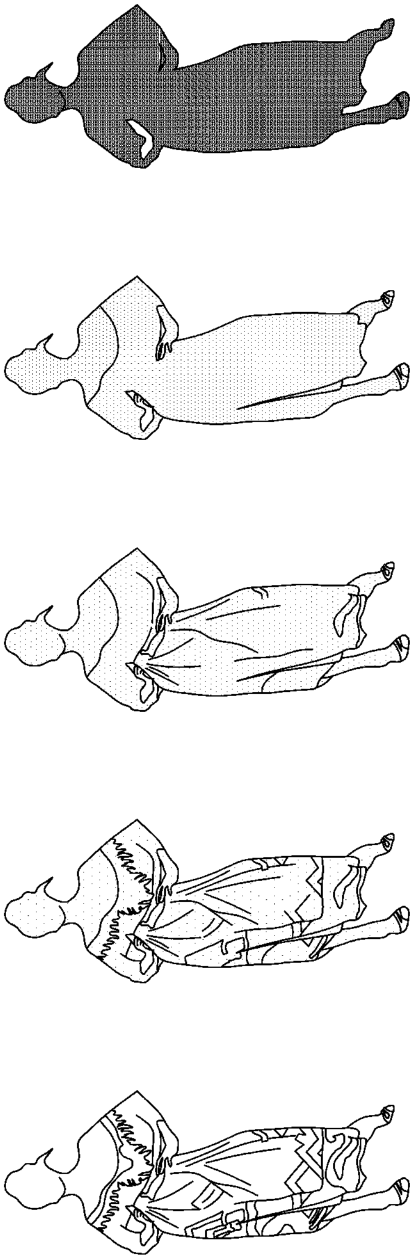
FIG. 42 illustrates point cloud data according to embodiments.

FIG. 42 illustrates point cloud data according to embodiments.

FIG. 42 shows an example of representing point cloud data based on LoDs as described above in FIG. 8. For example, as the LoD increases, the detail in data representation increases. In other words, both low-resolution and high-resolution data may be included depending on matched octrees according to embodiments.

FIG. 43 illustrates transmission of point cloud data depending on octree levels according to embodiments.

FIG. 43 shows an example of transmitting various information depending on octree levels when point cloud data is configured according to embodiments. To this end, three scenarios may be considered: 1) when both geometry and attributes are transmitted at full depth; 2) when both geometry and attributes are transmitted at partial depths; and 3) when geometry is fully transmitted but only a portion of attributes is transmitted. In these cases, the receiver may output different information.

As shown in FIG. 43, the encoder may configure a geometry bitstream for a partial octree based on octree depths and then generate and transmit a partial attribute bitstream in association therewith. When the octree depth level is closer to the root node (level), it allows for decoding of low-resolution point cloud data. Conversely, when the octree depth level is closer to the leaf node (level), it allows for decoding of full-resolution point cloud data. When partial geometry is transmitted, the remaining geometry data is not presented at the receiver (decoder). However, the remaining geometry data may be provided to the decoder as necessary information for attribute decoding.

Figure 44:
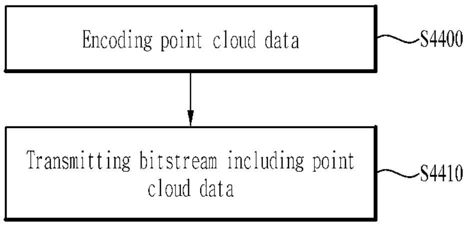
FIG. 44 illustrates a point cloud data transmission method according to embodiments.

FIG. 44 illustrates a point cloud data transmission method according to embodiments.

In S4400, the point cloud data transmission method according to the embodiments may include encoding point cloud data.

The encoding operation according to the embodiments may correspond to or include the point cloud video encoder 10002 of FIG. 1, the encoding 20001 of FIG. 2, the encoder of FIG. 4, the transmitting device of FIG. 12, the XR device 1430 of FIG. 15, the octree-based coding of FIGS. 15 to 19, the LoD-based coding of FIGS. 20 to 24, the bitstream generation of FIGS. 25, 26, and 40, the octree/LoD-based coding of FIG. 28, the group/LoD-based coding based on the geometry/attribute tree structure of FIGS. 32 to 39, the scalable coding of FIGS. 41 to 43, and so on.

In S4410, the point cloud data transmission method according to the embodiments may further include transmitting a bitstream including the point cloud data.

The transmission operation according to the embodiments may correspond to or include the transmitter 10003 of FIG. 1, the transmission 20002 of FIG. 2, the transmission of the geometry bitstream and attribute bitstream of FIG. 4, the transmission processor 12012 of FIG. 12, the XR device 1430 of FIG. 14, the transmission of a bitstream including point cloud data encoded as described in FIGS. 15 to 43.

Figure 45:
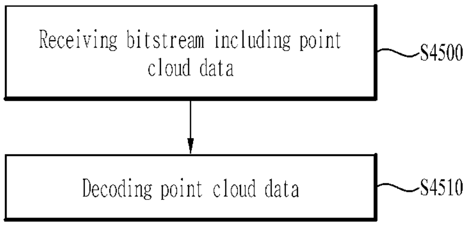
FIG. 45 illustrates a point cloud data reception method according to embodiments.

FIG. 45 illustrates a point cloud data reception method according to embodiments.

In S4500, the point cloud data reception method according to the embodiments may include receiving a bitstream including point cloud data.

The reception operation according to the embodiment may correspond to or include the receiver 10005, the reception 20002 in response to transmission of FIG. 2, the reception of bitstreams including geometry and attribute bitstreams of FIG. 10, the reception of geometry and attribute bitstreams of FIG. 11, the receiving device of FIG. 13, the XR device 1430 of FIG. 14, the reception of a bitstream including point cloud data encoded as described in FIGS. 15 to 43, and so on.

In S4510, the point cloud data reception method according to the embodiments may further include decoding the point cloud data.

The decoding operation according to the embodiment may correspond to or include the point cloud video decoder 10006 of FIG. 1, the decoding 20003 of FIG. 2, the decoder of FIGS. 10 and 11, the receiving device of FIG. 13, the XR device 1430 of FIG. 14, the octree-based decoding of FIGS. 15 to 19, the LoD-based decoding of FIGS. 20 to 24, the bitstream parsing of FIGS. 25, 26, and 40, the octree/LoD based decoding of FIG. 28, the group/LoD-based decoding based on the geometry/attribute tree structure of FIGS. 32 to 39, the scalable decoding of FIGS. 41 and 43, and so on.

Referring to FIG. 1, the point cloud data transmission method according to the embodiments may include: encoding point cloud data; and transmitting a bitstream including the point cloud data.

Referring to FIG. 15, regarding a colored octree and LoD generation, encoding the point cloud data may include encoding geometry data of the point cloud data; and encoding attribute data of the point cloud data. Encoding the attribute data may include generating LoDs for the attribute data based on an octree generated based on the geometry data. The geometry data and the attribute data may be matched with nodes of the octree, and the LoDs may be generated based on the octree where the matching is performed.

Referring to FIGS. 18 and 19, regarding octree colorization and duplication removal, the octree may include a parent node having child nodes based on an octree depth. Nodes of the octree including the geometry data may be matched with attribute data for the geometry data. When a child node has same attribute data as the parent node, the attribute of the child node may be removed.

Referring to FIGS. 20 to 31, regarding LoD generation, encoding the point cloud data may include: generating an octree for the point cloud data; and generating LoDs based on the octree. The LoDs may include point cloud data for at least one depth level of the octree.

Referring to FIGS. 23 and 33, regarding scalable attribute coding based on a layer group structure, encoding the point cloud data may include: representing geometry data of the point cloud data based on an octree; representing the geometry data as layer groups based on depth levels of the octree; and representing attribute data of the point cloud data as LoDs based on the layer groups. The bitstream may include point cloud data for parts of the layer groups and parts of the LoDs.

Referring to FIGS. 34 and 35, regarding LoD generation for a layer group structure, attribute data of a parent node of the octree may be selected based on attribute data of a child node of the parent node. Attribute data of a node belonging to a first LoD for a first octree depth may be encoded, and attribute data of a node belonging to a second LoD for a second octree depth below the first octree depth may be encoded. Layer groups each including one or more depths of the octree may be generated. When a first layer group including two or more depths is encoded, a node at a depth close to leaf nodes of the octree among the two or more depths may be encoded. The attribute data of the child node selected for the attribute data of the parent node may be inferred.

Referring to FIG. 36, regarding subgroup generation based on a layer group, encoding the point cloud data may include: representing geometry data of the point cloud data based on an octree; generating groups each including one or more depths of the octree; dividing a specific group into subgroups; generating a bitstream based on slices including the groups and the subgroups; representing attribute data of the point cloud data based on the octree; generating LoDs each including one or more depths of the octree; diving a specific LoD into sub-LoDs; and generating a bitstream based on slices including the LoDs and the sub-LoDs.

The transmission method may be performed by the transmitting device 10000. The transmitting device 10000 according to the embodiments may include an encoder configured to encode point cloud data; and a transmitter configured to transmit a bitstream including the point cloud data.

In a reception method in association with the transmission method, reverse processes of the transmission method may be performed. The point cloud data reception method according to the embodiments may include receiving a bitstream including point cloud data; and decoding the point cloud data.

Decoding the point cloud data may include: decoding geometry data of the point cloud data; and decoding attribute data of the point cloud data. Decoding the attribute data may include generating LoDs for the attribute data based on an octree generated based on the geometry data. The geometry data and the attribute data may be matched with nodes of the octree, and the LoDs may be generated based on the octree where the matching is performed. The octree may include a parent node having child nodes based on an octree depth. Nodes of the octree including the geometry data may be matched with attribute data for the geometry data. When a child node has same attribute data as the parent node, the attribute of the child node may be removed.

Decoding the point cloud data may include: generating an octree for the point cloud data; and generating LoDs based on the octree. The LoDs may include point cloud data for at least one depth level of the octree.

Decoding the point cloud data may include: representing geometry data of the point cloud data based on an octree; representing the geometry data as layer groups based on depth levels of the octree; and representing attribute data of the point cloud data as LoDs based on the layer groups. The bitstream may include point cloud data for parts of the layer groups and parts of the LoDs.

Attribute data of a parent node of the octree may be selected based on attribute data of a child node of the parent node. Attribute data of a node belonging to a first LoD for a first octree depth may be decoded, and attribute data of a node belonging to a second LoD for a second octree depth below the first octree depth may be decoded. Layer groups each including one or more depths of the octree may be generated. When a first layer group including two or more depths is encoded, a node at a depth close to leaf nodes of the octree among the two or more depths may be decoded. The attribute data of the child node selected for the attribute data of the parent node may be inferred.

The receiving method may be performed by the receiving device. The receiving device according to the embodiments may include a receiver configured to receive a bitstream including point cloud data; and a decoder configured to decode the point cloud data; may include.

According to the embodiments, the transmitter may transmit point cloud data to receivers with various performance levels, and the receivers may process the point cloud data suitable for the performance thereof. In other words, the transmitter may transmit point cloud data in a single bit stream to various receivers with low delay. The receivers may decode the point cloud data at various resolutions and provide the point cloud data with low delay even in low-power environments. Furthermore, attribute data may be efficiently compressed and restored in a scalable manner.

According to the embodiments, multiple slices may include attribute data units, and attributes may be sliced for spatial scalability. According to the embodiments, during scalable attribute coding, the attributes of node may be inferred based on ancestor/descendant relationships. By excluding inferred nodes from nodes at lower depts. in a layer group, the attributes of non-inferred nodes may be efficiently encoded.

According to the embodiments, attribute data may be scalably encoded. Further, the performance of scalable attribute coding may be improved by generating LoDs based on layer groups and skipping some LoDs.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of encoding point cloud data, the method comprising:

encoding geometry data for a slice of point cloud data based on an octree, wherein the slice is mapped to a subgroup of a layer group including levels of the octree; and encoding attribute data for the slice based on levels of detail (LoDs), wherein the encoded geometry data and the encoded attribute data are included in a bitstream, wherein the bitstream further includes information for representing a number of layer groups, an indicator of the layer group, information for representing a number of subgroups in the layer group, an indicator of the subgroup, information for an origin of a bounding box for the subgroup, and information for representing a size of the bounding box for the subgroup, and wherein a range of the indicator of the layer group is in 0 to the value of the information for representing the number of layer groups.

2. The method of claim 1, wherein the encoding the attribute data comprises generating the LoDs for the attribute data based on the octree, wherein the geometry data and the attribute data are matched with nodes of the octree, and wherein the LoDs are generated based on the octree where the matching is performed.

3. The method of claim 2, wherein the octree includes a parent node having child nodes based on an octree depth, wherein nodes of the octree including the geometry data are matched with attribute data for the geometry data, and wherein attribute data of a child node of the parent node that has same attribute data as the parent node is removed.

4. The method of claim 1, wherein the encoding the geometry data comprises generating the octree for the point cloud data, wherein the encoding the attribute data comprises generating the LoDs based on the octree, and wherein a level of the LoDs includes one or more levels of the octree.

5. The method of claim 1, wherein attribute data of a parent node of the octree is selected based on attribute data of a child node of the parent node, wherein attribute data of a node belonging to a first LoD for a first octree depth is encoded, wherein attribute data of a node belonging to a second LoD for a second octree depth below the first octree depth is encoded.

6. A device of encoding point cloud data, the device comprising:

a memory; and at least one processor connected to the memory, the at least one processor configured to:

encode geometry data for a slice of point cloud data based on an octree, wherein the slice is mapped to a subgroup of a layer group including levels of the octree; and encode attribute data for the slice based on levels of detail (LoDs), wherein the encoded geometry data and the encoded attribute data are included in a bitstream, wherein the bitstream further includes information for representing a number of layer groups, an indicator of the layer group, information for representing a number of subgroups in the layer group, an indicator of the subgroup, information for an origin of a bounding box for the subgroup, and information for representing a size of the bounding box for the subgroup, and wherein a range of the indicator of the layer group is in 0 to the value of the information for representing the number of layer groups.

7. A method of decoding point cloud data, the method comprising:

decoding geometry data for a slice of point cloud data in a bitstream based on an octree, wherein the slice is mapped to a subgroup of a layer group including levels of the octree; and decoding attribute data for the slice based on levels of detail (LoDs), wherein the bitstream includes information for representing a number of layer groups, an indicator of the layer group, information for representing a number of subgroups in the layer group, an indicator of the subgroup, information for an origin of a bounding box for the subgroup, and information for representing a size of the bounding box for the subgroup, and wherein a range of the indicator of the layer group is in 0 to the value of the information for representing the number of layer groups.

8. The method of claim 7, wherein the decoding the attribute data comprises generating the LoDs for the attribute data based on the octree, wherein the geometry data and the attribute data are matched with nodes of the octree, and wherein the LoDs are generated based on the octree where the matching is performed.

9. The method of claim 8, wherein the octree includes a parent node having child nodes based on an octree depth, wherein nodes of the octree including the geometry data are matched with attribute data for the geometry data, and wherein attribute data of a child node of the parent node that has same attribute data as the parent node is removed.

10. The method of claim 7, wherein the decoding the geometry data comprises generating the octree for the point cloud data; and wherein the decoding the attribute data comprises generating levels of detail (LoDs) based on the octree, wherein a level of the LoDs includes one or more levels of the octree.

11. The method of claim 7, wherein attribute data of a node belonging to a first LoD for a first octree depth is decoded, wherein attribute data of a node belonging to a second LoD for a second octree depth below the first octree depth is decoded, and wherein attribute data of a child node selected for attribute data of a parent node is inferred as the attribute data of the parent node.

12. A device of decoding point cloud data, the device comprising:

a memory; and at least one processor connected to the memory, the at least one processor configured to:

decode geometry data for a slice of point cloud data in a bitstream based on an octree, wherein the slice is mapped to a subgroup of a layer group including levels of the octree; and decode attribute data for the slice based on levels of detail (LoDs), wherein the bitstream includes information for representing a number of layer groups, an indicator of the layer group, information for representing a number of subgroups in the layer group, an indicator of the subgroup, information for an origin of a bounding box for the subgroup, and information for representing a size of the bounding box for the subgroup, and wherein a range of the indicator of the layer group is in 0 to the value of the information for representing the number of layer groups.

* * * * *